US006492911B1

(12) United States Patent
Netzer

(10) Patent No.: US 6,492,911 B1
(45) Date of Patent: Dec. 10, 2002

(54) CAPACITIVE DISPLACEMENT ENCODER

(75) Inventor: Yishay Netzer, Misgav (IL)

(73) Assignee: Netzer Motion Sensors Ltd., Misgav (IL)

( * ) Notice: Subject to any disclaimer, the term of this patent is extended or adjusted under 35 U.S.C. 154(b) by 0 days.

(21) Appl. No.: 09/294,749

(22) Filed: Apr. 19, 1999

(51) Int. Cl.$^7$ ............................................. G08C 19/10
(52) U.S. Cl. .................. 340/870.37; 324/658; 318/662; 341/15; 702/151
(58) Field of Search ................. 340/870.34, 870.35, 340/870.37; 324/658, 662; 341/15; 318/662; 702/151

(56) References Cited

U.S. PATENT DOCUMENTS

| | | | |
|---|---|---|---|
| 3,312,892 A | 4/1967 | Parnes | 323/93 |
| 3,668,672 A | 6/1972 | Parnell | 340/200 |
| 3,732,553 A | 5/1973 | Hardway, Jr. | 340/200 |
| 3,820,110 A | * 6/1974 | Henrich et al. | 340/870.37 |
| 3,845,377 A | 10/1974 | Shimotori | 318/662 |
| 3,873,916 A | 3/1975 | Sterki | 324/61 |
| 3,961,318 A | 6/1976 | Farrand et al. | 340/200 |
| 4,092,579 A | 5/1978 | Weit | 318/662 |
| 4,238,781 A | 12/1980 | Vercellotti et al. | 340/870.37 |
| 4,404,560 A | 9/1983 | Williams, Jr. | 340/870.37 |
| 4,429,307 A | 1/1984 | Fortescue | 340/870.37 |
| 4,586,260 A | 5/1986 | Baxter et al. | 33/125 |
| 4,788,546 A | 11/1988 | Sasaki | 340/870.37 |
| 4,851,835 A | 7/1989 | Krumholz et al. | 340/870.37 |
| 4,864,295 A | 9/1989 | Rohr | 340/870.37 |
| 4,893,071 A | * 1/1990 | Miller | 340/870.37 |
| 5,099,386 A | * 3/1992 | Stokes et al. | 361/298 |
| 5,598,153 A | 1/1997 | Brasseur et al. | 340/870.37 |

FOREIGN PATENT DOCUMENTS

| | | | |
|---|---|---|---|
| DE | 3328421 | 9/1984 | G01P/3/48 |
| DE | 3637529 | 3/1988 | G01B/7/02 |
| DE | 3711062 | 10/1988 | G01B/7/30 |
| DE | 4215701 | 7/1993 | G01B/7/30 |
| DE | 4215702 | 11/1993 | G01B/7/30 |
| DE | 19729347 | 1/1999 | |
| EP | 0 226 716 | 1/1987 | G01D/5/24 |
| EP | 0254707 | 1/1988 | |
| EP | 0 258 725 | 9/1988 | H03M/1/22 |
| EP | 0 459 118 | 4/1991 | G01D/5/24 |
| FR | 7729354 | 4/1978 | G01D/5/24 |
| GB | 2176013 | 10/1986 | G01B/7/30 |
| JP | 8278105 | 10/1996 | G01B/7/00 |

OTHER PUBLICATIONS

"Synchro/resolver conversion handbook", Fourth Edition, DDC ILC Data device Corp., Bohemia, New York, 1994, No page numbers.

I. J. Arnold and H. Heddergott "A Capacitance sensor principle for absolute angle of rotation measurement". *Electonpraxis*. Mar. 1989, pp. 95–98.

(List continued on next page.)

Primary Examiner—Timothy Edwards, Jr.
(74) Attorney, Agent, or Firm—Abelman, Frayne & Schwab

(57) ABSTRACT

A capacitive motion encoder, for sensing the position of a moving object relative to a stationary object, includes at least one stationary element, coupled to the stationary object and a moving element, coupled to the moving object and in proximity to the stationary element. A field transmitter generates an electrostatic field, which is modulated by a change in capacitance between the stationary and moving elements responsive to relative motion of the elements. A conductive shield, is electrically decoupled from both the moving and the stationary objects, and encloses the moving and stationary elements so as to shield the elements from external electrical interference. Processing circuitry is coupled to sense the modulated electrostatic field and to determine responsive thereto a measure of the position of the moving object.

19 Claims, 24 Drawing Sheets

OTHER PUBLICATIONS

X. Li et al., "An accurate low-cost capacitive absolute angular-position sensor with a full circle range", *IEEE Trans. Instrumentation and Measurement*, vol. 45 No. 2, Apr. 1996, pp. 516–520.

Wolffenbuttel et al., "An integrable capacitive angular displacement sensor with improved linearity", *Sensors and Actuators* A. 25–27 (1991), pp. 835–843.

W. C. Heerens, "Application of capacitance techniques in sensor design", *J. Phys. E: Sci. Instrum.*, 19 (1986), pp. 897–906.

Y. Ohshima et al., Eds., "Servo-sensors—Elements and Applications", pp. 171–173, Intertec Communications Inc., Ventura, CA, USA.

L. K. Baxter "Capacitive Sensors", Chap. 18, IEEE Press, New York 1997.

Y. Oshima and Y. Akiyama, "Magnetic and electrostatic motion system sensors", *PCIM*, pp. 56–60, Apr. 1989.

* cited by examiner

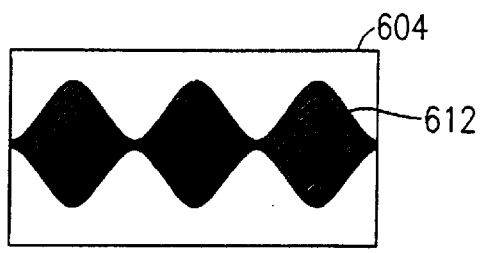
FIG. 26A
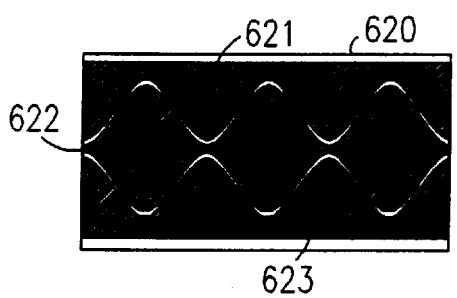
FIG. 26B
FIG. 27
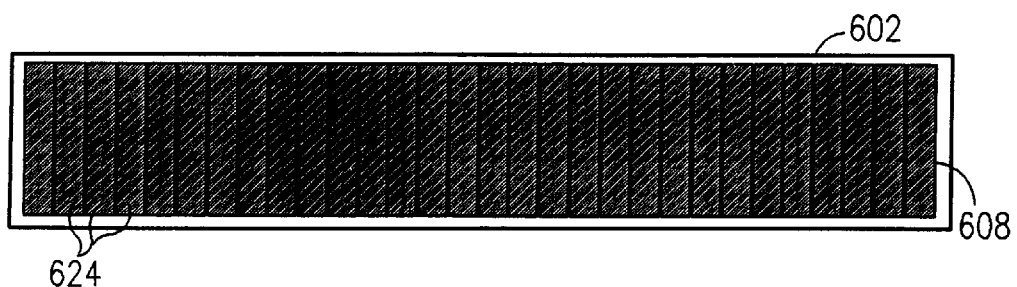
FIG. 28
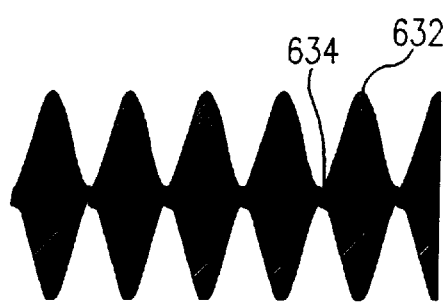

CAPACITIVE DISPLACEMENT ENCODER

FIELD OF THE INVENTION

The present invention relates generally to position sensors, and specifically to capacitive encoders of rotary or linear position.

BACKGROUND OF THE INVENTION

Measurements of rotation angle and of linear displacement are widely used in various fields for the control of position, velocity and acceleration. Non-contact sensors used for these purposes are described generally in the first chapter of the *Synchro/Resolver Conversion Handbook,* Fourth Edition, published by DDC ILC Data Device Corp. (Bohemia, N.Y., 1994), which is incorporated herein by reference.

Commercially-available, non-contact, full-rotation transducers (commonly known as rotation angle encoders) are almost exclusively either optical shaft encoders or electromagnetic resolvers. Both of these types of transducers are well known in the art. They are sold both as integrated devices, which include their own shaft and bearings, and as modular devices, to be mounted on a host shaft.

Optical encoders provide binary level output signals and can be divided into absolute and incremental types. Encoders of the latter type are more popular, due to their flat construction and low cost, despite suffering from the following shortcomings:

Only relative position is measured.

Such encoders are sensitive to mechanical assembly and mounting errors.

The construction of such encoders affords only limited mechanical durability.

Absolute optical encoders are more expensive, more bulky and usually non-modular. In recent years, a modified absolute encoder was introduced, which provides sinusoidal, rather than binary-level, outputs, which can be interpolated to provide enhanced resolution.

Electromagnetic resolvers, which are described in detail in the above-mentioned *Synchro/Resolver Conversion Handbook,* are wound inductive components. They are relatively bulky and expensive, but highly durable. Single pole-pair resolvers provide two output voltages, which are proportional to sin $\theta$ and to cos $\theta$, wherein $\theta$ is the rotation angle. Multi-pole-pair resolvers provide output voltages proportional to sin($n\theta$) and to cos($n\theta$), wherein n is the number of pole pairs. The resolution and accuracy of the multi-pole-pair resolver are high, but the output signals do not define the rotation angle unambiguously over a full rotation.

The two-speed resolver is equivalent to a combination of a single pole-pair and a multi-pole-pair resolver on the same shaft. It provides, simultaneously, two pairs of output voltages, which are referred to as coarse and fine channels. By processing both channels, an accurate and unambiguous reading is obtained. This kind of resolver, however, is even more bulky and expensive than its single or multi-pole-pair counterparts.

Linear optical encoders are incremental digital devices which, like incremental rotary encoders, include a reading head which moves relative to a ruler and generates output pulses. Currently, high-accuracy, long-stroke, linear encoders are almost exclusively of the optical type, although there are also some linear encoders based on magnetic principles.

There is no capacitive linear encoder that is available commercially as a stand-alone component, but linear capacitive encoders are widely used in digital calipers.

In the context of the present patent application and in the claims, the term "encoder" refers to displacement transducers in which the interaction between the stationary and moving elements is based on a repetitive pattern, with a either binary or continuous output signal. The terms "moving element" and "rotor" are used interchangeably with reference to rotary encoders, as are the terms "stationary element" and "stator." Likewise, the terms "reading head" and "ruler" refer respectively to the moving and stationary elements of linear encoders.

Even after many years of development, neither optical shaft encoders nor electromagnetic resolvers provide all of the following desirable features in combination:

Absolute reading with high accuracy and resolution.

Simple construction and low-profile packaging.

Low manufacturing costs.

Basic Concepts of Capacitive Rotation Angle Encoders

Capacitive, full-rotation, absolute angle encoders (CFRAAEs) convert rotation angle into an output signal based on capacitive interaction between a rotor and a stator. They can be built to emulate the single-pole or multi-pole electromagnetic resolver, i.e., with an output signal that repeats once or more times per rotation, as well as multi-speed resolvers.

CFRAAEs, as described in the patent literature, would be expected to provide significant advantages over optical and inductive encoders. But CFRAAE devices have been entirely absent from the market as the result of a variety of difficulties, not all of which have been fully identified, appreciated, or solved. For example:

Accurate CFRAAE operation demands the discrimination of capacitances under one Femto-Farad ($10^{-15}$ Farads) in the presence of parasitic capacitances and extraneous interference. Shielding against external interference is therefore of paramount importance.

It has been assumed that CFRAAEs requires costly, highly-accurate and stable electronic components. For example, German patent application DE 42 15 702 describes a capacitive angle encoder in which capacitances are individually corrected by laser trimming.

In CFRAAEs described in the patent literature, complex signal conditioning is required. Signal processing systems for use in this context are described, for example in German patent application DE 36 37 529 and in a corresponding U.S. Pat. No. 4,851,835, which is incorporated herein by reference.

There has been a lack of systematic classification and analysis of the various known encoder types. Consequently, novel configurations and possibilities for improvement have not been discovered.

It has therefore been the prevailing view in the field that a CFRAAE could not be commercially feasible. Only limited-rotation (substantially less than 360°) capacitive transducers have found practical use, and only in limited applications in which the transducer is integrated in a host system, mainly in optical mirror scanners. Typical limited-rotation transducers are described in U.S. Pat. Nos. 3,312,892, 3,732,553, 3,668,672, 5,099,386 and 4,864,295, which are incorporated herein by reference.

Analog full-rotation transducers, such as electromagnetic resolvers (in contrast with digital, or pulse-counting)

transducers, typically provide two orthogonal output signals proportional to the sine and cosine of the rotation angle. Since capacitive coupling, unlike inductive coupling, is always positive, the only way, in general, to obtain a bipolar output in a capacitive transducer is to measure the difference between two displacement-dependent capacitances.

FIG. 1 is a typical schematic circuit diagram illustrating this principle (which is also applicable to capacitive linear displacement transducers). Two complementary excitation voltages Q and Q' are applied to stationary transmitter plates 41 and 42, respectively. A moving receiver plate 40 is capacitively coupled to both transmitter plates and is connected to a charge amplifier 43, as is known in the art. The output voltage of the charge amplifier 43 is proportional to the difference of the respective capacitances $C_1$ and $C_2$ between receiver plate 40 and transmitter plates 41 and 42. The output of amplifier 43 is processed to provide the amplitude and polarity of the differential capacitance $C_1$–$C_2$, from which the position of plate 40 relative to plates 41 and 42 can be derived.

By analogy with electromagnetic resolvers, CFRAAEs can be made in both single-pole and multi-pole configurations. U.S. Pat. No. 5,598,153, which is incorporated herein by reference, describes a typical single-pole CFRAEE. French patent application 77 29354 describes a multi-pole encoder, in which the overlap between the rotor and a stator varies six times per revolution. The above-mentioned U.S. Pat. No. 4,851,835 describes an encoder in which a single rotor generates both coarse and fine signals.

Various methods are described in the relevant patent literature for converting a variable capacitance into output signal. The methods can be divided into two families:

1. Incorporating the variable capacitance in an oscillator circuit, which responds by varying its frequency, or duty cycle. Such methods are described, for example, in European patent application 0 459 118 A1; in German patent application DE 33 28 421; and in an article entitled "Kapacitives Sensorprinzip zur Absoluten Drehwinkelmessung" (A capacitive sensor principle for absolute angle of rotation measurement), by Arnold and Heddergott, in *Elektronpraxis* (March, 1989).

2. Incorporating an AC excitation source for obtaining at least one AC or DC output signal which is a function of angle-dependent capacitances in the encoder. Two such outputs are required if a full rotation is to be covered. For example, U.S. Pat. No. 4,092,579, which is incorporated herein by reference, describes a capacitive resolver having one excitation voltage source and two output voltage signals proportional, respectively, to the sine and cosine of the rotation angle. U.S. Pat. No. 4,429,307, also incorporated herein by reference, describes a capacitive encoder with a similar circuit arrangement, except that two excitation voltages of opposite polarities are used.

Similar approaches are described, for example, in European patent application 0 226 716; in German patent application DE 36 37 529; and in an article entitled "An Accurate Low-Cost Capacitive Absolute Angular-Position Sensor with A Full-Circle Range," by Xiujun Li, et al., in *IEEE Transactions on Instrumentation and Measurement*, 45:2 (April, 1996), pp. 516–520.

The accuracy of such CFRAEE schemes based on AC excitation depends on the quality of the excitation voltages. Inaccuracies may result to the extent that the excitation signals are not of high harmonic purity and equal in amplitude, or if there is deviation from exact 90° relative phase shift. The difficulties entailed can be overcome by circuit complexity, as illustrated by FIG. 3 in the above-mentioned German patent application DE 36 37 529. Solutions include complex digital emulation of the analog sinusoidal voltages, as proposed in European patent application 0 226 716, or employing accurate and stable analog circuit elements, as in the above-mentioned article by Li, et al.

German patent application DE 37 11 062 also describes a capacitive position measuring device using AC square wave excitation. The rotation angle is computed based on time sampling of a stepwise signal that results from interaction of the square wave excitation voltages with capacitance that varies with the rotor rotation (as shown in FIG. 2-d of that application). The disadvantage of such discrete sampling is an inferior signal-to-noise ratio (SNR), since sampling of the input voltage ignores its values between sampling times and is prone to noise.

Types of Capacitive Encoders

Various methods are known in the art for electrically connecting the rotor and stator elements of a CFRAAE so as to provide the required transmission, rotation-dependent modulation, and sensing of an electrostatic field in the encoder. For example, U.S. Pat. Nos. 3,873,916 and 4,404,560, which are incorporated herein by reference, have the general electrical configuration of FIG. 1, wherein transmitting plates 41 and 42 represent the stator, and receiving plate 40 represents the rotor. This configuration is problematic in that the rotor must be electrically connected to the processing electronics. To enable free rotation, a slip ring, with its known disadvantages of friction and unreliability, must be used to make the electrical connection.

Other encoder types have both the electrostatic field transmitter and the receiver located on one or more stator elements. For example, U.S. Pat. No. 5,099,386, which is incorporated herein by reference, describes an encoder which has a dielectrically-patterned, non-conductive rotor between transmitting and receiving stators. There is thus no need for electrical connection to the rotor, but the rotation angle is limited.

U.S. Pat. Nos. 3,668,672 and 3,732,553, which are incorporated herein by reference, describe CFRAAEs of generally similar construction to that in U.S. Pat. No. 5,099,386, except that the rotor has a patterned conductive coating. The coating is electrically grounded and serves as an electrical shield that selectively varies the measured capacitance between the stator elements. Various methods have been proposed for grounding the rotor. For example, FIG. 10 of U.S. Pat. No. 3,668,672 shows slip rings in use for this purpose. This approach has the disadvantages of friction, low reliability, and high cost. U.S. Pat. No. 3,732,553 provides rotor grounding by relying on the contact between the grounded encoder housing and the rotor through a shaft to which the rotor is fixed, but this contact can also be problematic, as described further hereinbelow.

European patent application 0 459 118 illustrates (in FIG. 2 thereof) a contacting tip used to ground a rotor. This approach suffers from similar disadvantages to those of the U.S. patents cited above. Similarly, grounded rotors are used in capacitive encoders described in the above-mentioned article by Li, et al., and in an article entitled "An Integrable Capacitive Angular Displacement Sensor with Improved Linearity," by Wolffenbuttel and Van Kampen, in Sensors and Actuators A.25–27 (1991), pp. 835–843.

Another type of CFRAAE has conductive-coatings on both sides of the rotor, which are electrically interconnected but otherwise floating. If at least one coating is patterned, then the rotor serves as an angle-dependent coupling bridge between transmitter and receiver plates on the stators. Encoders of this type are described in U.S. Pat. Nos. 3,845,377, 3,312,892, 4,092,579, 4,851,835, 4,238,781 and 4,788,546, which are incorporated herein by reference, and in German patent application DE 42 15 702. In U.S. Pat. No. 4,851,835, one side of a multi-pole rotor pattern is separated into multiple individual elements.

In another, "foldback" configuration, described in U.S. Pat. Nos. 3,961,318 and 4,429,307, which are incorporated herein by reference, the transmitter and receiver plates are placed on a common stationary substrate of a single stator on one side of the rotor and are coupled by the conductive pattern on the rotor. Alternatively, in a symmetrical version of this type of encoder, two stator elements, each with its own transmitter and receiver plates, are placed on either side of the rotor. CFRAAEs of this type are described in U.S. Pat. No. 4,788,546, which is incorporated herein by reference, as well as in German patent application DE 37 11 062, and U.K. patent application GB 2 176 013.

Capacitive Linear Displacement Encoders

Capacitive linear displacement encoders (CLDEs) are also known in the art, but have used only a portion of the possible topologies suggested in the CFRAAE literature. For example, U.S. Pat. No. 4,429,307, which is incorporated herein by reference, describes a CLDE having a head that includes two sinusoidal conductive patterns, which are excited by two complementary excitation voltages. The voltages are generated on a ruler and capacitively coupled to the head via coupling strips, or transmitter plates. The patterns on the head couple back to sine and cosine receiver plates on the ruler. The moving head is thus capacitively coupled to the ruler and does not need electrical wiring. There is no mention in the patent as to how the receiver plates are protected from external interference and how direct coupling from the coupling strips to the receiver plates is eliminated. Also, since the gains of the sine and cosine channels depend on the air gaps of their respective coupling strips, any difference between the air gaps will affect the relative gain. The accuracy is therefore sensitive to tilt between the head and ruler and necessitates very stable and accurate electronic components.

U.S. Pat. No. 3,961,318, which is incorporated herein by reference, describes two different versions of Type 5 CLDEs. In the first version, the ruler is electrically unwired and capacitively coupled to the head, which includes both excitation sources and the receiver. The ruler electrodes can be segmented and isolated from each other, so as to enable several rulers to be butted together without electrical interconnection, and thus to extend the measurement range. The second version is similar to that in the above-mentioned U.S. Pat. No. 4,429,307. As in that patent, the ratio of the sine and cosine signals is sensitive to both tilt and component tolerance, and no answer is provided to problems of parasitic capacitive coupling between the adjacent transmitter and receiver plates or of protection against external interference.

U.S. Pat. No. 4,586,260, which is incorporated herein by reference, describes a digital Vernier caliper that employs a capacitive linear encoder. This encoder is further described in Chapter 18 of *Capacitive Sensors,* by Larry K. Baxter (IEEE Press, 1997). The excitation is provided by means of two complementary square waves, and the head is divided into sine and cosine portions, each including is own receiver plate and amplifier. The ruler is unwired. The disadvantages of this CLDE are as follows:

1. Since there are two signal channels, separated both spatially and electronically, their gain matching is sensitive to head tilt and to electronic component tolerance and temperature stability.
2. The ruler pattern is rectangular rather than sinusoidal. The resulting spatial harmonics of the pattern, although largely suppressed by the air gap, limit the accuracy obtainable by interpolation.
3. There are gaps between individual ruler elements that are perpendicular to the direction of motion and add further spatial harmonics.

High-accuracy CLDE devices known in the art are incremental, i.e., they give a relative, rather than absolute, displacement reading. On the other hand, U.S. Pat. No. 3,312,892, which is incorporated herein by reference, describes a capacitive displacement transducer which is based on the overlap between triangular stationary plates and a rectangular moving plate. This configuration constitutes an absolute, but essentially "coarse," encoder.

SUMMARY OF THE INVENTION

It is an object of the present invention to provide improved devices and methods for capacitive position sensing.

It is an object of some aspects of the present invention to provide improved capacitive rotation angle encoders, and particularly full rotation absolute angle encoders.

It is an object of other aspects of the present invention to provide improved capacitive linear displacement encoders.

It is yet a further object of some aspects of the present invention to provide compact, self-contained capacitive position encoders.

It is still a further object of some aspects of the present invention to provide encoders that exhibit improved accuracy and reduced sensitivity to external interference and environmental conditions.

In preferred embodiments of the present invention, a capacitive motion encoder, for sensing the position of a moving object relative to a stationary object, includes at least one stationary element, coupled to the stationary object, and a moving element, coupled to the moving object. A periodic (time-modulated) electrostatic field is transmitted by a transmitter plate, which is preferably on the stationary element, but may alternatively be on the moving element. An electrically active pattern on one of the elements, typically on the moving element, modulates the envelope of the time-modulated electrostatic field responsive to motion of the moving object. The pattern preferably comprises conductive material plated on the element, although methods of creating patterned dielectric moving element may also be used. The term "electrically active," as used in the context of the present patent and in the claims, may refer to any such pattern. Processing circuitry senses the modulated electrostatic field and analyzes the envelope modulation to determine a measure of the position of the moving object.

The moving and stationary elements are substantially enclosed by a conductive shield, which is electrically decoupled from both the moving and the stationary objects, and which shields the elements from electrical interference. The inventor has found, in distinction to capacitive position sensors known in the art, that separating the shield from other objects around the encoder affords superior protection of the inherently-low signal levels in the encoder against both external interference and parasitic coupling to excitation voltages supplied to generate the electrostatic field and operate the encoder. Preferably, the conductive shield encloses the processing circuitry, as well as the moving and stationary elements.

In some preferred embodiments of the present invention, the encoder comprises a rotation angle encoder, preferably a full rotation absolute angle encoder. In these embodiments, the moving element comprises a rotor, the moving object comprises a rotating shaft, and the at least one stationary element comprises one or more stators, such that the processing circuitry determines a measure of the rotational position of the shaft. The shield and rotor preferably have a labyrinthine configuration in a region in which the rotor is attached to the shaft, so as to prevent leakage of electrical interference into the shield.

In other preferred embodiments of the present invention, the encoder comprises a linear displacement encoder. In these embodiments, the stationary element preferably comprises a linear ruler, which may be too long to be practically enclosed by the shield. In this case, the shield preferably encloses the moving element and a portion of the stationary element over which the moving element is positioned at any given time.

In some preferred embodiments of the present invention, a capacitive rotation angle encoder for sensing position of a rotating shaft comprises a transmitter and a receiver, typically in the form of transmitting and receiving plates on one or more stators. The transmitter is made up of multiple segments disposed about the shaft, each of which generates a periodic electrostatic field at a common frequency, but having a different, predetermined phase from the other segments. Preferably, four segments are used for each one or more poles on the rotor. The transmitter segments are excited with AC voltages, which are in mutual quadrature. The resulting fields are modulated by rotation of a rotor, and the modulated fields are received by the receiver.

Processing circuitry associated with the encoder comprises two synchronous detector circuits, which receive periodic inputs from two, respective transmitter excitation sources and process signals from the receiver in synchronization with the generated field so as to generate outputs indicative of the sine and cosine of the rotation angle. Preferably, the detector circuits follow a single charge amplifier through which the signals due to all of the transmitter segments are received for processing. The use of such phase/quadrature excitation (PQE) and synchronous detection enables the angle of the rotor to be determined with greater accuracy, better signal-to-noise ratio and reduced sensitivity to deviation in component values than is achieved by encoders known in the art, which typically use signal sampling, rather than full synchronous detection, or employ more than one signal processing channel, rather than the single charge amplifier of the present invention. Consequently, neither high-stability, precision circuitry nor component trimming is required. The resulting simple circuitry can be conveniently packaged together with the rotor and stator(s) and protected within the conductive shield.

Alternatively, the encoder comprises a unitary transmitter and segmented receiver plates, and outputs sine and cosine signals as described above. In one of these preferred embodiments, the encoder further comprises a rectifier, which rectifies an AC input to the encoder so as to provide DC voltage to the detector circuit, so that the encoder can be conveniently substituted for an inductive resolver.

In other preferred embodiments of the present invention, the principles of phase/quadrature excitation are applied to impart similar advantages to a capacitive linear encoder.

In some preferred embodiments of the present invention, the encoder comprises a multi-speed encoder, wherein the electrically-active pattern comprises smoothly-varying, coarse and fine periodic electrically-active patterns, which are preferably sinusoidal in shape. The coarse and fine patterns have respective low and high spatial frequencies as a function of position on the element on which the patterns are formed. As the moving element moves, the patterns modulate an envelope of the electrostatic field in accordance with the low and high spatial frequencies. The processing circuitry senses the modulation so as to determine coarse- and fine-resolution measures of the position of the moving object. The demodulated outputs of the processing circuitry are very accurate because of the smooth variation of the patterns, unlike multi-speed encoders known in the art. Preferably, the coarse measure is an absolute measure of rotational or linear position.

In one of these preferred embodiments, the moving element further has an intermediate electrically active pattern thereon, having a spatial frequency between the high and low frequencies. The processing circuitry senses modulation of the field corresponding to the intermediate pattern, as well, in order to determine a measure of the position of the moving object at a resolution intermediate the coarse and fine measures.

In some of these multi-speed embodiments, the coarse pattern is divided into a plurality of segments, distributed over a surface of the moving element so as to reduce variations arising in the modulation of the field due to tilt of the rotor relative to the stator. Segmentation of the pattern for this purposed may also be applied in single-speed embodiments of the present invention.

In some preferred embodiments of the present invention in which the encoder comprises coarse and fine patterns, the processing circuitry switches the electrostatic field so that it is modulated alternately by the two patterns. The circuitry thus alternately determines coarse and fine measures of the position of the moving object. The switching is preferably performed by alternately exciting different transmitting regions of the stationary element. By virtue of switching between the regions in this manner, both the coarse and fine measurements can be made using a single stationary element and a single moving element, typically a single stator and a single rotor, and without duplication in the signal processing circuitry.

In other preferred embodiments of the present invention, the rotor of a capacitive rotation angle encoder has an electrically-active pattern, which repeats multiple times about the shaft at a predetermined angular frequency and is also characterized by a rotational asymmetry, such as an eccentricity. The processing circuitry senses modulation of the electrostatic field due to the pattern so as to determine a fine measure of the rotation angle, and also sense modulation due to the eccentricity in order to determine a coarse measure of the rotation angle of the shaft. There is thus no need for a separate coarse pattern and detection channel, as in the preceding preferred embodiments, so that the center hole of the encoder—in the case of a hollow-shaft encoder—can be made relatively larger to accommodate larger shaft sizes.

In some preferred embodiments of the present invention, the moving element comprises a plurality of electrically-active segments, which are mutually separated by open spaces in the substrate to eliminate moisture film effects. The segments may or may not be electrically insulated. Preferably, the moving element comprises a rotor, wherein the electrically active segments protrude radially outward around the shaft. The use of electrically and mechanically separated segments both reduces the sensitivity of the encoder to tilt and prevents moisture accumulation from affecting the reading. Although some capacitive encoders known in the art use three-dimensional electrically-active patterns, none are open in the manner of the present invention.

In some preferred embodiments of the present invention, first and second stationary elements are disposed on opposing sides of the moving element so as to transmit an electrostatic field therethrough. A potential stabilization circuit maintains the moving element at a steady, virtually-grounded potential by sensing AC potential at the first stationary element and applying and opposite potential to the second stationary element. No physical or electrical contact with the moving element is required. Grounding the moving element is known in the art to be advantageous in certain types of encoders. Unlike the present invention, however, prior art encoders of such types require contact to be made with the moving element, using a slip ring, for example, in order to ground it.

In some preferred embodiments of the present invention, the encoder comprises a linear displacement encoder, wherein the stationary element comprises a ruler, and the moving element comprises a reading head that travels along the ruler. In some of these preferred embodiments, the transmitter and receiver plates are on the head, and the electrically-active pattern with which the plates interact is on the ruler. In other embodiments, the transmitter plates are on the ruler, and the receiver pattern is on the head.

In some of these preferred embodiments, the ruler comprises a flexible printed circuit material, which is fixed along a surface of the stationary object, for example, on a machine that is controlled using the encoder. The surface may be flat or curved. In one such preferred embodiment, the stationary object is generally cylindrical, and the encoder is used to measure angle around an axis of the cylinder.

Preferably, the pattern on the ruler or on the head is designed for improved stability and accuracy of measurement by comparison with capacitive linear encoders known in the art, particularly in terms of immunity to variations in alignment, angle and spacing between the reading head and ruler, as well as immunity to external interference and humidity. Preferably, the pattern is symmetrical with respect to relative tilt of the head and ruler in both up/down and side-to-side directions, so as to reduce tilt sensitivity. Further preferably, the pattern is intermittently broken by gaps, particularly in embodiments in which the pattern is on the ruler, so as to prevent coupling of interference by the pattern into the reading head. Preferably, phase/quadrature excitation is applied to the transmitter plates, and the output of a single receiving plate and amplifier associated therewith is processed using synchronous detection, as described hereinabove.

In some preferred embodiments of the present invention, the capacitive linear displacement encoder provides an absolute position measurement. Preferably, the measurement is made by alternately sensing fine and coarse patterns on the reading head or on the ruler. Alternatively or additionally, an index is provided at one end of the ruler, and an index position of the reading head is sensed using the index in order to provide an absolute reference position for subsequent incremental measurements. An index may similarly be provided in rotation angle encoders in accordance with preferred embodiments of the present invention.

There is therefore provided, in accordance with a preferred embodiment of the present invention, a capacitive motion encoder for sensing the position of a moving object relative to a stationary object, including:

at least one stationary element, coupled to the stationary object;

a moving element, coupled to the moving object and in proximity to the stationary element;

a field transmitter, which generates an electrostatic field, which is modulated by a change in capacitance between the stationary and moving elements responsive to relative motion of the elements;

a conductive shield, which is electrically decoupled from both the moving and the stationary objects, and which encloses the moving and stationary elements so as to shield the elements from external electrical interference; and processing circuitry, coupled to sense the modulated electrostatic field and to determine responsive thereto a measure of the position of the moving object.

Preferably, the moving element includes a rotor, and the moving object includes a rotating shaft, and wherein the at least one stationary element includes at least one stator, such that the processing circuitry determines a measure of the rotational position of the shaft. Further preferably, the conductive shield encloses at least a portion of the processing circuitry together with the rotor and the at least one stator. Most preferably, the at least one stator and the rotor include printed circuit boards, on at least one of which at least the portion of the processing circuitry is mounted.

Preferably, the rotor includes a generally planar plate and a substantially non-planar, annular hub for coupling the rotor to the shaft, and the shield extends into the plane of the rotor adjacent to the hub so as to prevent electrical interference from passing from the shaft to the rotor. Preferably, the encoder is configured so that the rotor can rotate by at least 360° relative to the stator.

In a preferred embodiment, the encoder includes a mechanical housing around the moving and stationary elements, which housing is electrically decoupled from the shield. Preferably, the at least one stationary element includes two generally parallel, mutually spaced stationary elements, one including the field transmitter and the other including a field receiver, which are electrically coupled one to the other in the housing by pressure of the elements against a flexible conductive member therebetween.

Preferably, the stationary element includes a printed circuit board including an extension which protrudes through the shield, to which an electrical connection is made to the encoder.

In a preferred embodiment, the field transmitter is attached to the stationary element and is coupled so as to form a part of the conductive shield.

Preferably, the field transmitter is attached to the stationary element, and the moving element has an electrically-active pattern thereon, which modulates the electrostatic field. Preferably, the electrically-active pattern includes a conductive material or, alternatively or additionally, a dielectric material. Preferably, the at least one stationary element includes a receiver of the electrostatic field, which is coupled to the processing circuitry. Preferably, the conductive, electrically-active pattern on the moving element is held at a generally constant potential. Alternatively, the conductive, electrically-active pattern on the moving element is electrically floating. In a preferred embodiment, the at least one stationary element includes a single element to which both the transmitter and receiver are attached. In another preferred embodiment, the encoder includes a second stationary element having both a transmitter and receiver attached thereto.

Alternatively, the conductive material on the moving element is coupled to the processing circuitry and serves as a receiver of the electrostatic field.

There is also provided, in accordance with a preferred embodiment of the present invention, a capacitive angle encoder for sensing position of a rotating shaft, including:

a transmitter, including multiple segments disposed about the shaft, each segment generating a periodic electrostatic field at a common frequency, but having a different, predetermined phase from the other segments;

a receiver, which generates signals responsive to the fields from the multiple segments such that the strength of reception of each of the fields is modulated by a variation of a capacitance between the transmitter and the receiver as a function of rotation of the shaft; and a detector circuit including at least one synchronous detector, which processes the signals in synchronization with the generated field so as to generate an output indicative of the rotation angle.

Preferably, the at least one synchronous detector includes two synchronous detectors, which generate respective outputs proportional to the sine and cosine of the rotation angle. Further preferably, the receiver includes a single input amplification channel through which the signals from all of the transmitter segments are received for processing.

Preferably, the transmitter plate includes a generally planar transmitting stator, divided into multiple segments disposed around an axis of the shaft, wherein the multiple segments are most preferably arranged in four quadrants.

There is additionally provided, in accordance with a preferred embodiment of the present invention, a capacitive angle resolver for sensing position of a rotating shaft, including:

a transmitter, which generates a periodic electrostatic field responsive to an AC electrical input at a given frequency;

a receiver, including multiple segments disposed about the shaft, which generate signals responsive to the field from the transmitter such that the field received at each of the segments is modulated by a variation of a capacitance between the transmitter and the receiver as a function of rotation of the shaft;

a signal processing circuit, which processes the signals from the receiver segments so as to generate an AC output indicative of the rotation angle; and a rectifier circuit, which rectifies the AC input so as to provide DC voltage to the detector circuit.

Preferably, the encoder includes a rotor coupled to rotate with the shaft and having an electrically active pattern thereon, such that rotation of the rotor modulates the field received at the receiver. Further preferably, the electrically active pattern includes conductive material, which is most preferably held at a ground potential.

There is further provided, in accordance with a preferred embodiment of the present invention, a capacitive motion encoder for sensing the position of a moving object relative to a stationary object, including:

at least one stationary element, coupled to the stationary object;

a moving element, coupled to the moving object and in proximity to the stationary element;

an electrostatic field transmitter, associated with one of the stationary or moving elements;

a field modulator associated with another of the stationary and moving elements, including smoothly-varying coarse and fine periodic electrically-active patterns on the element, the patterns varying along a dimension of the element with respective low and high spatial frequencies, which modulate the electrostatic field by inducing a variation in capacitance between the stationary and moving elements responsive to relative motion of the elements, at modulation frequencies corresponding to the low and high spatial frequencies, substantially without spatial harmonics thereof; and processing circuitry, coupled to sense the modulated electrostatic field and to determine responsive thereto coarse and fine measures of the position of the moving object.

Preferably, the stationary element includes stator, made of a single planar element including a plurality of conductive areas, at least one of which is the field transmitter, and another of which receives the field.

Further preferably, the moving element includes a rotor, on which the electrically-active patterns are formed such that the coarse periodic pattern includes a generally circular area on the rotor, disposed eccentrically about the shaft, and the fine periodic pattern includes a sinusoidal pattern on the rotor, disposed circumferentially around the shaft.

In a preferred embodiment, the field modulator further includes an intermediate electrically active pattern thereon, having a spatial frequency intermediate the high and low frequencies, and the processing circuitry senses modulation of the field corresponding to the intermediate frequency.

There is moreover provided, in accordance with a preferred embodiment of the present invention, a capacitive motion encoder for sensing the position of a moving object relative to a stationary object, including:

at least one stationary element, coupled to the stationary object;

a moving element, coupled to the moving object and in proximity to the stationary element;

an electrostatic field transmitter, associated with one of the stationary or moving elements;

a field modulator associated with another of the stationary and moving elements, including coarse and fine, periodic, electrically-active patterns on the element, the patterns varying along a dimension of the element with respective low and high spatial frequencies, which modulate the electrostatic field by inducing a variation in capacitance between the stationary and moving elements responsive to relative motion of the elements, at modulation frequencies corresponding to the low and high spatial frequencies; and processing circuitry, which switches the electrostatic field so that it is modulated alternately by the coarse or by the fine pattern, and which senses the modulated field so as to alternately determine, responsive thereto, coarse and fine measures of the position of the moving object.

There is in addition provided, in accordance with a preferred embodiment of the present invention, a capacitive motion encoder for sensing the position of a moving object relative to a stationary object, including:

a stationary element, coupled to the stationary object, and including an electrostatic field transmitter and receiver;

a moving element, coupled to the moving object and in proximity to the stationary element, and including a field modulator including coarse and fine periodic electrically-active patterns on the moving element, which vary along a dimension of the element with respective low and high spatial frequencies, and which modulate the electrostatic field by inducing a variation in capacitance between the stationary and moving elements responsive to relative motion of the elements, at modulation frequencies corresponding to the low and high spatial frequencies; and processing circuitry, coupled to sense the modulated electrostatic field and to determine responsive thereto coarse and fine measures of the position of the moving object.

There is also provided, in accordance with a preferred embodiment of the present invention, a capacitive angle encoder for sensing the position of a rotating shaft, including:

one or more stators, one of which includes a field transmitter which generates an electrostatic field;

a rotor, coupled to rotate with the shaft, and having a rotationally-asymmetric electrically-active pattern thereon which modulates the electrostatic field responsive to rotation of the shaft by inducing a variation in capacitance between the stator and the rotor that repeats once for each rotation of the shaft, wherein the pattern is divided into a plurality of sub-areas so as to reduce variations arising in the modulation of the field due to tilt of the rotor relative to the stator; and processing circuitry, coupled to sense the modulated electrostatic field and to determine, responsive to the coarse and fine variations, coarse and fine measures of the angle of the shaft.

Preferably, the electrically-active pattern on the rotor includes a generally circular area located eccentrically relative to an axis of the shaft.

There is still further provided, in accordance with a preferred embodiment of the present invention, a capacitive angle encoder for sensing position of a rotating shaft, including:

a rotor, coupled to the shaft, having an electrically-active region which has a rotational asymmetry about an axis of the shaft and includes a pattern disposed circumferentially on the rotor which repeats multiple times about the shaft at a predetermined angular frequency;

at least one stator, having an electrostatic field associated therewith, which is modulated due to a variation in capacitance induced by the electrically active region due to rotation of the rotor; and processing circuitry, which senses modulation of the field occurring once per rotation of the shaft due to the rotational asymmetry of the region so as to determine, responsive thereto, a coarse measure of the rotation angle of the shaft, and which senses modulation of the field due to the pattern so as to determine a fine measure of the rotation angle.

In a preferred embodiment, the encoder includes a receiver coupled to one of the one or more stators and characterized by a rotational asymmetry relative to the shaft axis such that the coarse measure of the angle is determined responsive to an interaction between the asymmetries of the fine pattern and the receiver.

In another preferred embodiment, the encoder includes a switch, which is actuated to determine alternately the coarse and fine measures of the angle.

There is furthermore provided, in accordance with a preferred embodiment of the present invention, a moisture-resistant capacitive motion encoder for sensing the position of a moving object relative to a stationary object, including:

at least one stationary element, coupled to the stationary object, and having an electrostatic field associated therewith;

a moving element, coupled to the moving object, including a plurality of electrically active segments mutually separated by spaces, the segments forming a pattern that modulates the electrostatic field due to a variation in capacitance between the stationary and moving elements as the moving element moves; and processing circuitry, coupled to sense the modulated electrostatic field and to determine responsive thereto a measure of the position of the moving object.

Preferably, fluid impinging on the moving element is displaced from the segments to the spaces separating the segments.

In a preferred embodiment, the moving object includes a rotating shaft, and the moving element includes a rotor from which the electrically active segments protrude radially outward around the shaft, and the at least one stationary element includes at least one stator, such that the processing circuitry determines a measure of the rotational position of the shaft.

There is moreover provided, in accordance with a preferred embodiment of the present invention, a capacitive motion encoder for sensing the position of a moving object relative to a stationary object, including:

a moving element, coupled to the moving object, having an electrically-active pattern thereon;

first and second stationary elements, coupled to the stationary object, disposed on opposing sides of the moving element so as to transmit an alternating electrostatic field therethrough;

processing circuitry, coupled to sense modulation of the electrostatic field responsive to a variation in capacitance between the stationary elements due to movement of the electrically-active pattern therein and to determine responsive thereto a measure of the position of the moving object; and a potential stabilization circuit, which maintains the moving element at a generally constant potential by sensing an alternating electrical potential at the first stationary element and applying an opposite potential to the second stationary element.

Preferably, the generally constant potential includes a virtual ground. Further preferably, the potential stabilization circuit makes substantially no electrical contact with the moving element.

There is yet further provided, in accordance with a preferred embodiment of the present invention, a capacitive linear displacement encoder, for sensing the position of a moving object relative to a stationary object, including:

a ruler, fixed to the stationary object;

a reading head, fixed to the moving object so as to move along the ruler, and including an electrostatic field transmitter, which generates an electrostatic field in a vicinity of the reading head;

an electrically-active pattern formed on the ruler, which pattern causes a variation in capacitance between the ruler and reading head so as to modulate the electrostatic field responsive to motion of the reading head relative to the ruler, the pattern having a symmetry such that the modulation is substantially unaffected by tilt of the head relative to the ruler; and processing circuitry, coupled to sense the modulated electrostatic field, so as to detect the modulation and determine responsive thereto a measure of the position of the moving object.

Preferably, the pattern includes a double sinusoid. Further preferably, the reading head includes a receiver, which receives the modulated electrostatic field, and the pattern is intermittently broken by gaps in the pattern, so as to inhibit coupling of interference along the pattern into the reading head, wherein the gaps are formed at an acute angle relative to a longitudinal axis of the ruler.

There is moreover provided, in accordance with a preferred embodiment of the present invention, a capacitive linear displacement encoder, for sensing the position of a moving object relative to a stationary object, including:

a ruler, fixed to the stationary object, and including an electrostatic field transmitter, which generates an electrostatic field in a vicinity of the ruler;

a reading head, fixed to the moving object so as to move along the ruler and having an electrically-active pattern formed thereon, which pattern causes a variation in capacitance between the ruler and reading head so as to modulate the electrostatic field responsive to motion of the reading head relative to the ruler, the pattern having a symmetry such that the modulation is substantially unaffected by tilt of the head relative to the ruler; and processing circuitry, coupled to sense the modulated electrostatic field, so as to detect the modulation and determines responsive thereto a measure of the position of the moving object.

There is additionally provided, in accordance with a preferred embodiment of the present invention, a capacitive linear displacement encoder, for sensing the position of a moving object relative to a stationary object, including:

a ruler, fixed to a curved surface of the stationary object;

a reading head, fixed to the moving object so as to move along the ruler;

an electrostatic field transmitter, which generates an electrostatic field in a vicinity of the reading head;

an electrically-active pattern formed on the ruler or the reading head, which pattern causes a variation in capacitance between the ruler and the reading head so as to modulate the electrostatic field responsive to motion of the reading head relative to the ruler; and processing circuitry, coupled to sense the modulated electrostatic field, so as to detect the modulation and determines responsive thereto a measure of the position of the moving object along the curved surface.

In a preferred embodiment, the stationary object has a generally cylindrical form, and wherein the measure of the position of the moving object includes an angular measurement about an axis of the stationary object.

There is furthermore provided, in accordance with a preferred embodiment of the present invention, a capacitive linear displacement encoder, for sensing the position of a moving object relative to a stationary object, including:

a ruler, fixed to the stationary object;

a reading head, fixed to the moving object so as to move along the ruler;

transmitting plates fixed to the ruler, so as to generate and receive an electrostatic field in a vicinity of the reading head, the plates having coarse and fine reading configurations;

an electrically-active receiving plate on the reading head, the plate configured such that motion of the head relative to the ruler causes a variation in capacitance between the transmitting and receiving plates, which modulates the electrostatic field received by the receiving plate; and processing circuitry, coupled to sense the modulated electrostatic field, so as to detect the modulation of the field in the coarse reading configuration so as to determine responsive thereto a coarse measure of the position of the moving object, and to detect the modulation of the field in the fine reading configuration so as to determine responsive thereto a fine measure of the position of the moving object.

Preferably, the coarse measure includes an absolute position measurement.

In a preferred embodiment, the transmitting plate includes a plurality of transmitting bars, which are collectively divided into at least two triangular regions, and wherein in the coarse configuration the bars in each of the regions are collectively excited. Preferably, the receiving plate includes a conductive, periodic pattern superimposed on a generally quadrilateral region, and wherein when the transmitting plate is operating in the coarse reading configuration, the entire quadrilateral region is held at a common electrical potential.

There is also provided, in accordance with a preferred embodiment of the present invention, a capacitive motion encoder for sensing the position of a moving object relative to a stationary object, including:

at least one stationary element, coupled to the stationary object;

a moving element, coupled to the moving object;

transmitting and receiving plates fixed to the stationary or the moving element, so as to generate and receive an electrostatic field in a vicinity of the moving element, the plates including at least one index plate at an index position on the stationary element, such that the electrostatic field encountered by the moving element while in proximity to the at least one index plate is identifiably different from that at other locations along the stationary element;

an electrically-active pattern formed on one of the elements, which pattern causes a variation in capacitance between the elements so as to modulate the electrostatic field responsive to motion of the moving element relative to the stationary element; and processing circuitry, coupled to sense the modulated electrostatic field, and to identify the difference in the field when the moving element is in proximity to the index plate so as to determine responsive thereto that the moving element is in the index position, and which detects the modulation and determines responsive thereto a measure of the position of the moving object relative to the index position.

There is still further provided, in accordance with a preferred embodiment of the present invention, a method for sensing position of a rotating shaft, including:

transmitting periodic electrostatic fields having a common frequency at a plurality of angular locations around the shaft, each field having a different, predetermined phase from the other signals;

sensing the fields from the plurality of locations, and generating signals responsive to modulation of the fields engendered due to a variation in capacitance as a function of rotation of the shaft; and processing the signals in synchronization with the frequency of the transmitted fields so as to generate outputs indicative of the rotation angle.

There is yet further provided, in accordance with a preferred embodiment of the present invention, a method for sensing position of a rotating shaft, including:

receiving an AC electrical input at a given frequency;

generating a periodic electrostatic field responsive to the AC input;

rectifying a portion of the AC input so as to provide DC voltage to a detector circuit;

sensing the field at a plurality of locations, and generating signals responsive to modulation of the fields engendered due to a variation in capacitance as a function of rotation of the shaft; and processing the signals using the detector circuit so as to generate an AC output at the given frequency indicative of the rotation angle.

There is additionally provided, in accordance with a preferred embodiment of the present invention, a method for sensing the position of a moving object relative to a stationary object, including:

transmitting an electrostatic field in a vicinity of the moving object;

associating smoothly-varying coarse and fine periodic electrically-active patterns with the moving object, the patterns varying along a dimension of motion of the object with respective low and high spatial frequencies, which modulate the electrostatic field by inducing a variation in capacitance between the stationary and moving elements responsive to relative motion of the elements, at modulation frequencies corresponding to the low and high spatial frequencies, substantially without spatial harmonics thereof; and sensing the modulated electrostatic field and to determine responsive thereto coarse and fine measures of the position of the moving object.

There is moreover provided, in accordance with a preferred embodiment of the present invention, a method for sensing the position of a moving object relative to a stationary object, including:

transmitting an electrostatic field in a vicinity of the moving object;

associating coarse and fine, periodic, electrically-active patterns with the moving object, the patterns varying along a dimension of motion of the object with respective low and high spatial frequencies, which modulate the electrostatic field by inducing a variation in capacitance between the stationary and moving elements responsive to relative motion of the elements, at modulation frequencies corresponding to the low and high spatial frequencies;

switching the electrostatic field so that it is modulated alternately by the coarse or by the fine pattern; and sensing the modulated field so as to alternately determine, responsive thereto, coarse and fine measures of the position of the moving object.

There is furthermore provided, in accordance with a preferred embodiment of the present invention, a method for sensing position of a rotating shaft, including:

coupling to the shaft a rotor with an electrically-active region which has a rotational asymmetry relative to an axis of the shaft and includes a pattern disposed circumferentially on the rotor, which pattern repeats multiple times about the shaft at a predetermined angular frequency;

transmitting an electrostatic field in a vicinity of the moving object;

sensing modulation of the field occurring once per rotation due to the rotational asymmetry of the region so as to determine, responsive thereto, a coarse measure of the rotation angle of the shaft; and sensing modulation of the field due to the pattern so as to determine a fine measure of the rotation angle.

There is also provided, in accordance with a preferred embodiment of the present invention, a method for sensing the position of a moving object relative to a stationary object, including:

coupling a moving element, having an electrically-active pattern thereon, to the moving object;

disposing first and second stationary elements on opposing sides of the moving element so as to transmit an electrostatic field therethrough;

sensing an electrical potential at the first stationary element and applying an opposite potential to the second stationary element so as to maintain the moving element at a generally constant potential; and sensing modulation of the electrostatic field responsive to a variation in capacitance between the stationary elements due to movement of the electrically-active pattern therein so as to determine responsive thereto a measure of the position of the moving object.

There is likewise provided, in accordance with a preferred embodiment of the present invention, a method for sensing the position of a moving object relative to a curved surface, including:

fixing a reading head to the moving object;

fixing a flexible ruler along the curved surface;

providing an electrically-active pattern on the ruler or the reading head, which pattern causes a variation in capacitance between the ruler and the reading head so as to modulate the electrostatic field responsive to motion of the reading head relative to the ruler;

generating an electrostatic field in a vicinity of the reading head; and sensing the modulated electrostatic field, so as to detect the modulation and determines responsive thereto a measure of the position of the moving object along the curved surface.

The present invention will be more fully understood from the following detailed description of the preferred embodiments thereof, taken together with the drawings in which:

BRIEF DESCRIPTION OF THE DRAWINGS

FIGS. 26A and 26B are side views of reading heads for use in a capacitive linear encoder, showing electrically-active patterns thereon, in accordance with preferred embodiments of the present invention;

FIG. 27 is a side view of a ruler for use in a capacitive linear encoder, in accordance with a preferred embodiment of the present invention;

FIG. 28 is a side view of a segmented conductive pattern on a ruler for use in a capacitive linear encoder, in accordance with a preferred embodiment of the present invention;

DETAILED DESCRIPTION OF PREFERRED EMBODIMENTS

Typological Classification of Capacitive Encoders

For the purposes of the present patent application, it is useful to classify capacitive rotational and linear encoders by types. Each type is characterized in terms of the location of electrostatic field transmitter and receiver plates and the electrical characteristics and connection of the rotor. This classification is described and used hereinbelow for convenience and clarity of description of preferred embodiments of the present invention, and may be applied to capacitive encoders known in the art, as well. It will be understood, however, that the principles of the present invention are not limited to a particular type, except where such a limitation is expressly stated.

Figure 1:
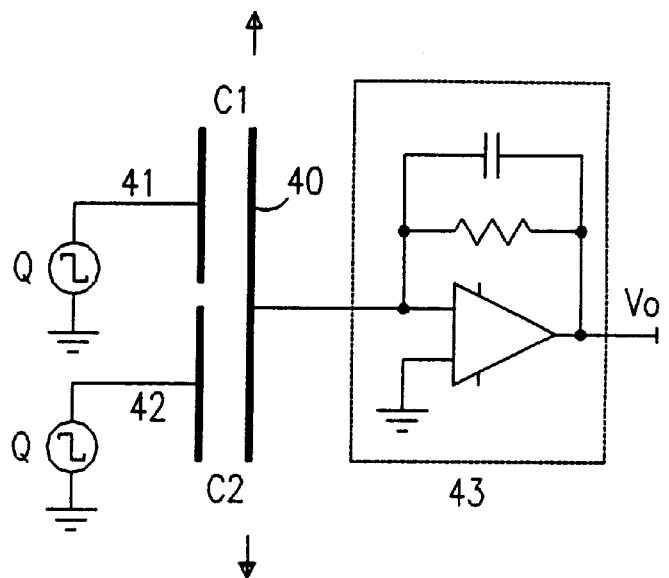
FIG. 1 is a schematic circuit diagram showing a simplified capacitive position sensor, as is known in the art.
Figure 2:
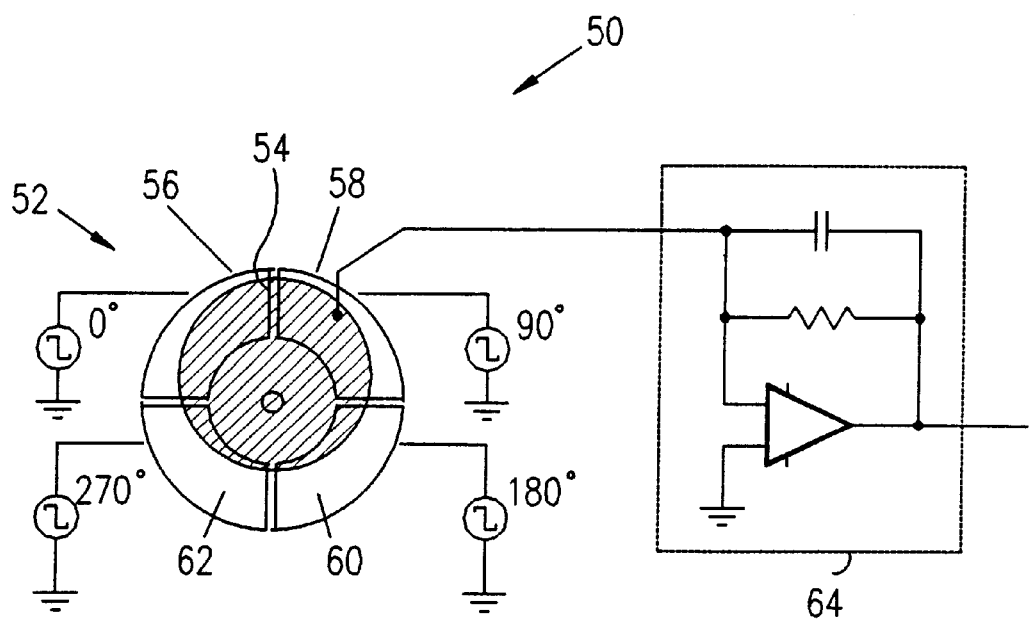
FIG. 2 is a schematic illustration showing a top view of a single pole capacitive rotation angle encoder and circuitry associated therewith, in accordance with a preferred embodiment of the present invention.

FIG. 2 is a schematic top view of a single pole CFRAAE 50 with a rotor element 54 and a single stator element 52 that includes four quadrant plates 56, 58, 60 and 62, in accordance with a preferred embodiment of the present invention. This type of encoder is classified herein as "Type 1." The quadrants are excited with alternating voltages of equal frequency and with relative phase shifts of 0°, 90°, 180°, and 270°, respectively. Both stator and rotor elements typically comprise an insulating substrate (not shown for simplicity), onto which a conductive pattern is deposited. Consequently a capacitance between the rotor and stator elements varies as the rotor moves.

The pattern of rotor 54 is configured as an eccentric circle, as described, for example, in *Servo Sensors—Elements and Applications,* edited by Y. Ohshima and Y. Akiyama, Intertec Communications Inc. (Ventura, Calif.), which is incorporated herein by reference. The differential coupling between this eccentric circular pattern and each diagonal pair of quadrants 56–60 and 58–62 of stator plate 52 is proportional, respectively, to the sine or cosine of the rotation angle.

The output voltage of a charge amplifier 64 connected to the rotor is proportional to the weighted sum of the four excitation voltages and can be processed to extract the desired sine and cosine of the rotation angle. The approach is referred to hereinafter as Phase/Quadrature Excitation (PQE). The above-mentioned U.S. Pat. No. 5,598,153 describes an encoder similar in construction to CFRAAE 50, but having non-sinusoidal outputs.

The Type 1 encoder, as shown in FIG. 2, is deficient in that rotor 54 must be electrically connected to the processing electronics. It is useful, however, in situations in which the shaft on which the rotor is mounted is already connected to electrical power and can freely rotate with the processing electronics.

FIGS. 3A–3E are schematic, sectional illustrations showing five other types of CFRAAE, denoted Types 2 through 6, in accordance with preferred embodiments of the present invention. These types allow the displacement of a moving member to be converted into a proportional capacitance change without the constraint of electrical connection to the rotor. They can be used conveniently for angular encoders with unlimited rotation, and some of them can be employed for linear displacement sensing, as well.

Figure 3A:
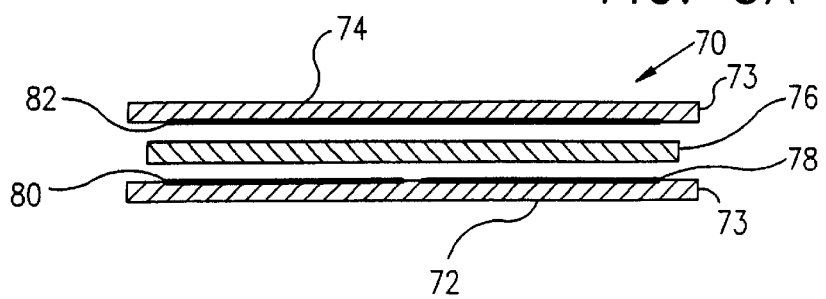
FIGS. 3A–3E are schematic, sectional illustrations showing types of capacitive motion encoders, in accordance with preferred embodiments of the present invention.

FIG. 3A illustrates a Type 2 encoder 70. A patterned, electrically non-conductive (dielectric) rotor 76 is situated between two stationary stator elements 72 and 74, each comprising a non-conductive substrate 73. Element 72 is coated with conductive transmitter plates 78 and 80, and element 74 is coated with a conductive receiver plate 82. Transmitter plates 78 and 80 are electrically excited and interact capacitively with receiver plate 82. The presence of rotor 76 increases the capacitance between the plates in accordance with its dielectric constant. This type of encoder is relatively insensitive to rotor tilt and axial position. An encoder of this type is described in the above-mentioned U.S. Pat. No. 5,099,386.

Figure 3B:
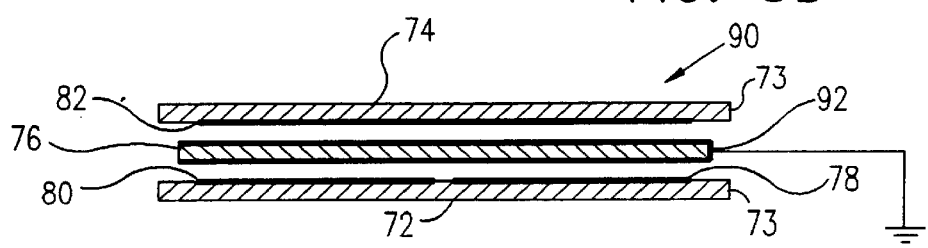

FIG. 3B illustrates a Type 3 encoder 90, which is similar to Type 2 encoder 70 except that rotor 76 has a patterned conductive coating 92, which is electrically grounded and serves as an electrical shield that selectively varies the measured capacitance between stator elements 72 and 74. Like Type 2, this type is also relatively insensitive to rotor tilt and axial position. In Type 3 encoders known in the art, however, there are difficulties in grounding the rotor. Slip rings, as described in the above-mentioned U.S. Pat. No. 3,668,672, for example, have disadvantages of friction, low reliability, and high cost. It is possible to ground the rotor by contact with the grounded encoder housing through a shaft to which the rotor is fixed, as described in the above-mentioned U.S. Pat. No. 3,732,553, but this approach has two serious disadvantages:

1. A non-reliable ground contact with the rotor may result from build-up of a lubricant film on shaft bearings.
2. Electrical noise on the housing is imposed on the rotor and is coupled to the receiver.

Figure 3C:
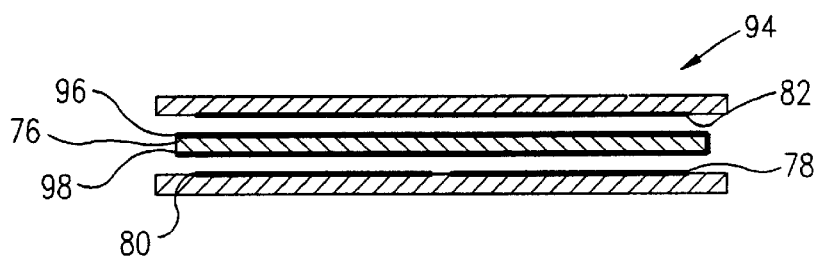

FIG. 3C illustrates a Type 4 encoder 94, which is similar to Type 3 except that both sides of rotor 76 are coated with conductive coatings 96 and 98, respectively, which are electrically interconnected but otherwise floating. If the coatings are patterned, then the rotor serves as an angle-dependent coupling bridge between transmitter plates 78 and 80 and receiver plate 82. Type 4 encoders known in the art are described in the above-mentioned U.S. Pat. Nos. 3,845, 377, 3,312,892, 4,092,579, 4,851,835, 4,238,781 and 4,788, 546.

Figure 3D:
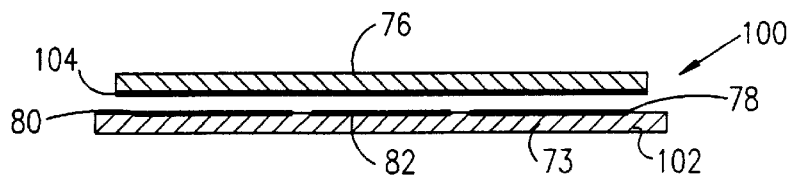

FIG. 3D illustrates a Type 5 encoder 100, which can be considered a "foldback" version of Type 4. In this type, transmitter plates 78 and 80 and receiver plate 82 are placed on a common stationary substrate 73 of a single stator 102 on one side of rotor 76. A conductive pattern 104 on the rotor is energized by the transmitter plates and couples back to the receiver plate. The output signal from the receiver plate is proportional to the variable mutual capacitance between the rotor and the stator. Type 5 encoders known in the art are described in the above-mentioned U.S. Pat. Nos. 3,961,318 and 4,429,307.

Figure 3E:
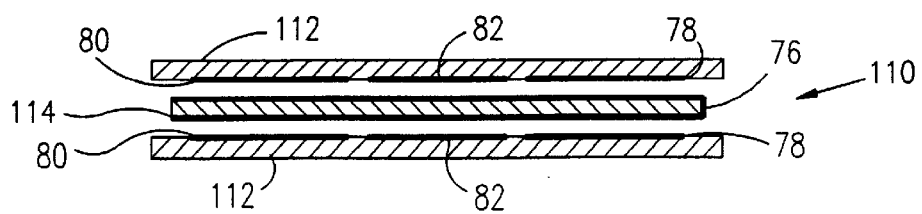

FIG. 3E illustrates a Type 6 encoder 110, which is essentially a symmetrical version of Type 5 encoder 100. Encoder 110 includes interconnected identical stator elements 112, one on each side of rotor 76, which has a conductive pattern 114 on both its sides. Type 6 encoders known in the art are described in the above-mentioned U.S. Pat. No. 4,788,546, as well as in the German patent application DE 37 11 062, and U.K. patent application GB 2 176 013. Due to its symmetry, this configuration is less sensitive to tilt error of the rotor relative to the rotation axis than is Type 5.

CFRAAE Construction and Electrostatic Shielding Considerations

Figure 4:
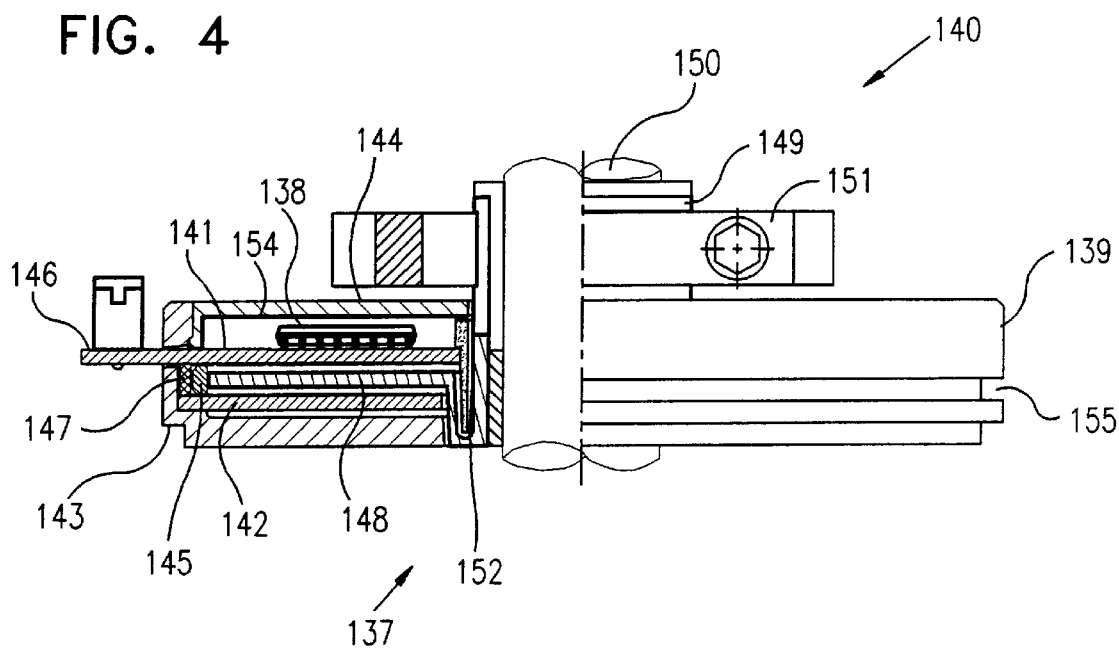
FIG. 4 is a partly sectional view of a capacitive rotation angle encoder, in accordance with a preferred embodiment of the present invention.

FIG. 4 is a partly sectional illustration of a capacitive full-rotation absolute angle encoder (CFRAAE) 140, in accordance with a preferred embodiment of the present invention. Encoder 140 includes two generally planar stators 141 and 142 and a planar rotor 148, preferably made from printed circuit boards. The encoder is contained in a housing 139 made up of a short cylindrical enclosure 143 and a cover 144, which are preferably snap-joined. The housing is preferably injection-molded from plastic, such as polycarbonate. Alternatively, it can be made out of metal. Stators 141 and 142 are separated by means of an electrically conductive spacer ring 145, which also serves as part of an electrical shield for the encoder, as described further hereinbelow.

Stator 141 preferably comprises a multi-layer printed-circuit board, on which processing circuitry 138 is mounted. A portion 146 of the board of stator 141 extends outside housing 139 to serve as a connection terminal. Stator 142 has an electrically-conductive area thereon which serves as an electrostatic field transmitter, and stator 141 has a corresponding area that serves as the receiver. The stators are electrically interconnected by means of an elastomeric directional conductor 147, known commercially as "Zebra," which forms the connection between the stators under pressure applied when housing 139 is closed, and does not need soldering.

Figure 19:
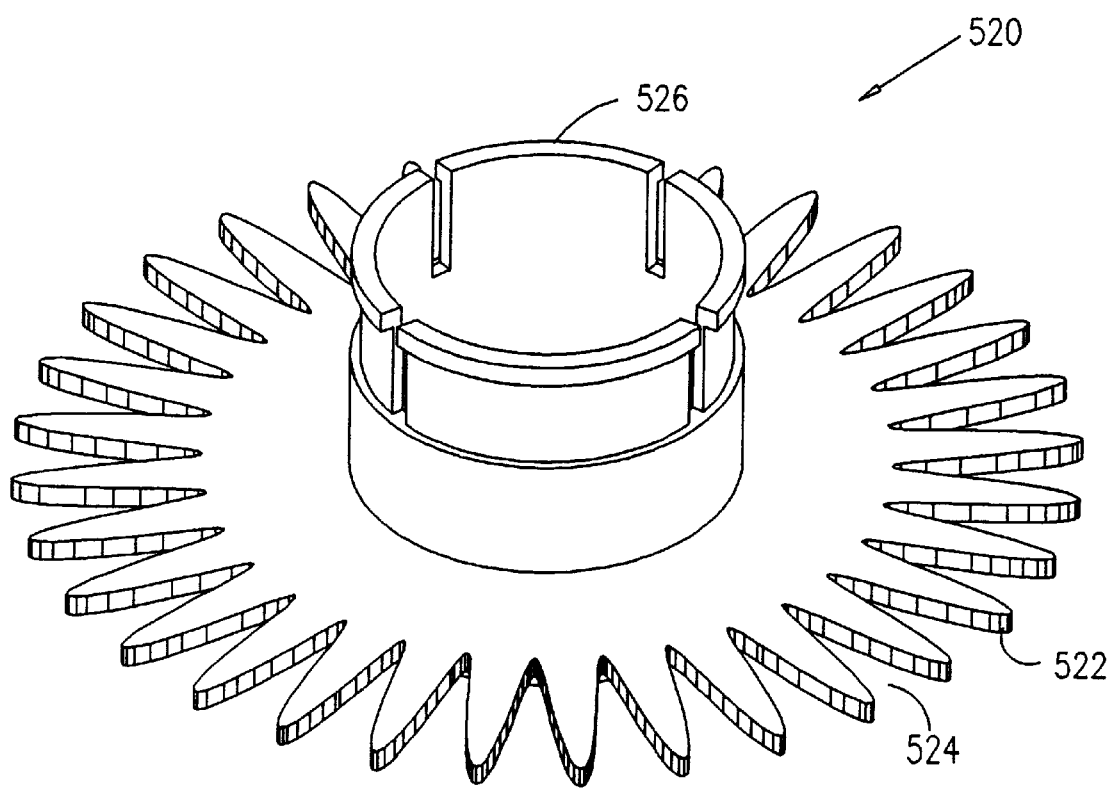
FIG. 19 is an illustration of a rotor having a three-dimensional pattern, for use in a capacitive rotation angle encoder, in accordance with a preferred embodiment of the present invention.

Rotor 148, which preferably is of the form that is illustrated schematically in FIG. 19, has an axial extension 149 with a center hole for direct mounting to a host shaft 150 by means of a clamp ring 151. This hollow-shaft attachment scheme has the advantages of simplicity and compactness. A peripheral grove 155 receives mounting screws (not shown) which hold housing 139 in a manner known in the art as a servo-mount. An inner conductive sleeve 152 (along with an optional outer sleeve 153, shown in FIG. 6) serves to create a labyrinth 137. The labyrinth is coupled to a conductive coating 154 inside housing 139 so as to provide electrical shielding of the space containing rotor 148 and of circuitry 138, as detailed further hereinbelow. The shielding protects the encoder from external electrical interference, as well as from interference that might otherwise penetrate the housing via shaft 150. If housing 139 is made from metal, conductive coating 154 is preferably separated from the housing by a non-conductive interlayer (not shown).

The simple, hollow-shaft construction of encoder 140 is enabled by high mechanical mounting error-tolerance afforded by the present invention, as described further hereinbelow, which is especially significant if encoder 140 is a multi-pole CFRAAE. By contrast, to apply the hollow-shaft concept to optical encoders necessitates not only internal bearings, to preserve the radial alignment between the rotor and stator, but also mounting the complete encoder housing on a flexible mounting frame to absorb mechanical misalignment between the hollow shaft of the encoder and the host shaft on which it is mounted. A typical optical encoder of this type is the model HS35 Sealed Hollowshaft, produced by Danaher Controls, of Gurnee, Ill.

Another benefit of the design of encoder 140, resulting from the tolerance to mechanical mounting errors, is that a single CFRAAE of this type can be used for a range of shaft diameters. This is accomplished by making the center-hole of rotor 148 as large as possible, and employing a set of adapters (not shown) for mounting on shafts of smaller diameters. Encoder 140 can also be produced with an integral shaft and bearings to secure minimum misalignment between the rotor and the stator when very high accuracy is needed.

Figure 5:
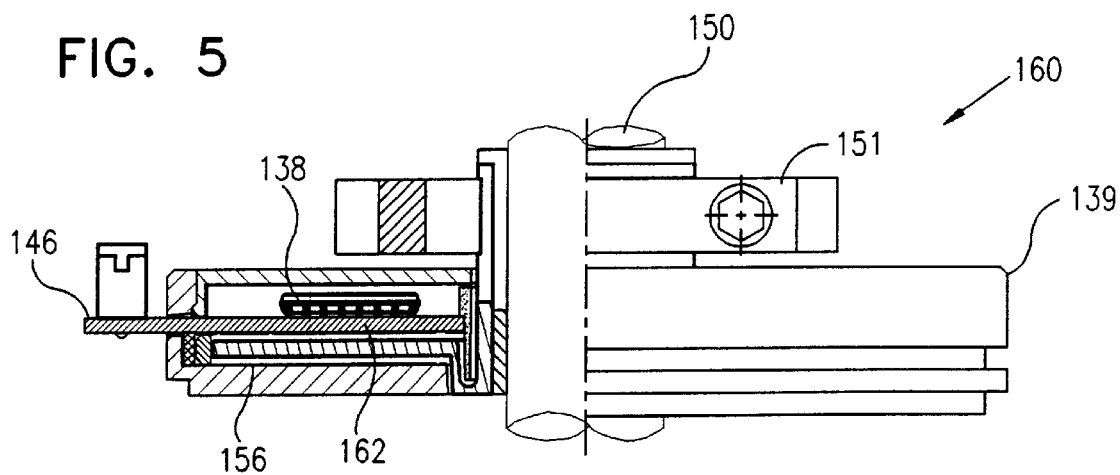
FIG. 5 is a partly sectional view of a capacitive rotation angle encoder, in accordance with another preferred embodiment of the present invention.

FIG. 5 illustrates an encoder 160, in accordance with an alternative preferred embodiment of the present invention. The construction of encoder 160 is based on similar principles to those of encoder 140, but the encoder has only a single stator plate 162. This variation is useful particularly for Type 5 encoders, as illustrated in FIG. 3D. A conductive coating 156 inside housing 139 of encoder 160 shields rotor 148, taking the place of the shielding provided by stator plate 142 in encoder 140. In another electrical configuration of encoder 160, coating 156 may include a section that serves as transmitter plates, rather than being a grounded, continuous coating. In both cases the coating is connected to plate 162 via a Zebra connector.

Encoders having the configurations shown in FIGS. 4 and 5 have been produced by the inventor. These encoders typically have an outer diameter of 57 mm and can accommodate shaft diameters of up to 12 mm. Rotor 148 is typically designed to include 32 pole-pairs. The resolution thus obtained is 20 bits (about $1/1000$ of a degree), and the accuracy, without error modeling, is 16 bits (about $1/100$ of a degree). The power consumption is about 20 mW. Details of how these specifications are achieved are described hereinbelow.

Although preferred embodiments described herein relate to encoders in which the stator and rotor are generally planar (and can thus advantageously be made using photolithographic processes), it will be understood that the principles of the present invention may similarly be applied to capacitive encoders of other geometries. For example, in an alternative embodiment of the present invention, not shown in the figures, a CFRAAE comprises a cylindrical rotor and stator.

The need to protect the receiver plate from capacitively-coupled interference is known in the art, but existing CFRAAE devices have failed to provide sufficiently effective protection. Examples of mechanical construction of prior art capacitive encoders are shown in the references cited in the Background of the Invention. In all of these examples, the mechanical housing, made out of metal, also serves as an electrostatic shield, which is grounded to the signal ground. The actual effectiveness of this protection is limited, however, since the mechanical environment in which the encoder is operating is likewise connected to the same signal ground potential. In typical applications in which the encoder is coupled to the shaft of an electrical motor (and particularly when it is mounted inside the motor housing), the encoder output signals will be contaminated as a result of ground currents. This is a particularly serious problem when a switching power supply is used, as in brushless DC or AC vector-controlled motors.

A further problem, not recognized in the art, is interference coupled into the encoder through the shaft. Since the shaft is commonly made out of metal and passes through the supposedly-protected inner space of the encoder, any noise on the shaft will be coupled to the receiver plate. Again, this situation is most serious when the encoder shares a common shaft with a switch-mode motor. The problem is aggravated above certain shaft speeds, because a lubricant film builds on bearing balls and erratically interrupts the electrical continuity between the rotor and the housing. The rotor and shaft become, in effect, electrically floating and serve as a capacitive bridge that couples noise from the windings of the motor stator to the receiver plate of the encoder.

Figure 6:
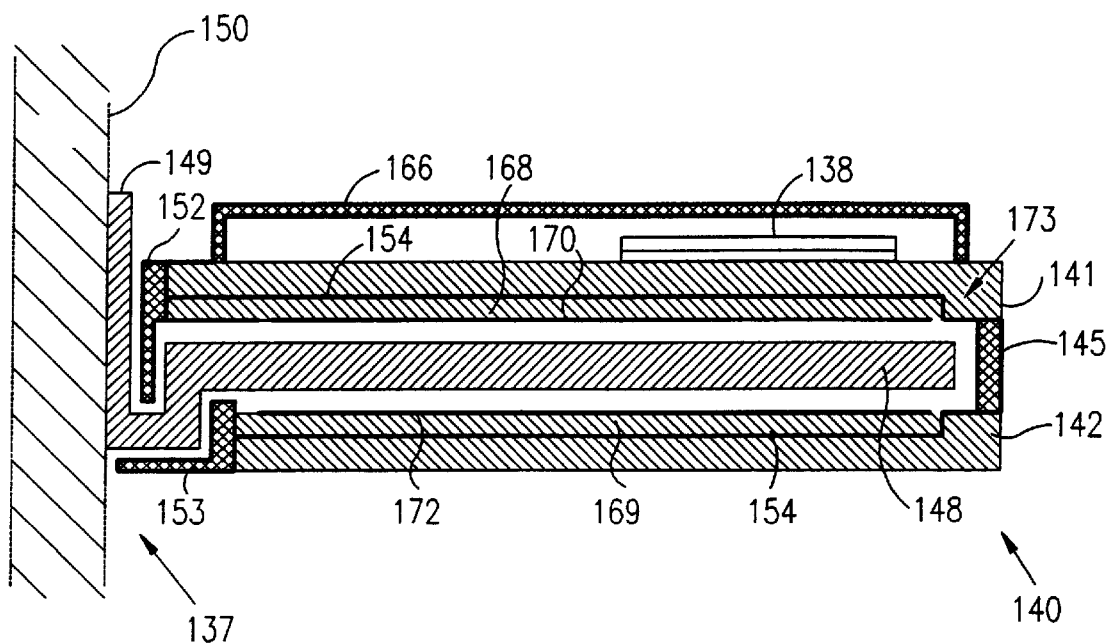
FIG. 6 is a schematic, sectional illustration showing details of electrical shielding of a capacitive rotation angle encoder, in accordance with a preferred embodiment of the present invention.

FIG. 6 is a schematic, sectional illustration of encoder 140 showing details of an electrostatic protection scheme, in accordance with a preferred embodiment of the present invention. Stators 141 and 142 are shown to comprise printed circuit substrates 168 and 169, respectively having a receiving plate 170 and transmitting plates 172 plated thereon. Rotor 148 has an electrically active pattern, i.e., one that alters the capacitance between the transmitting and receiving plates. Preferably, although not necessarily, the rotor comprises a printed circuit substrate with conductive portions plated thereon to form the pattern. The stators, the rotor and air gaps therebetween, as well as at least a portion of processing circuitry 138, mainly the receiver preamplifier, are protected by an electrostatic shield 173. This shield comprises conductive inner layer 154, conductive ring 145 which separates the two stators 141 and 142, and labyrinth 137, including sleeves 152 and 153, which effectively blocks capacitive coupling from shaft 150 to the zone inside the shield, but still enables mechanical coupling between the shaft and rotor 148.

Both encoder housing 139 (shown in FIG. 4) and shaft 150 are electrically neutral and may assume any potential.

Unlike encoders known in the art, the housing does not serve any electrical function and can be made economically out of plastic. A shield 166 over circuitry 138 preferably comprises a conductive coating on the inside of the housing, which is commonly grounded with shield 173. The ground connection to shield 166 can be obtained by contact with the printed circuit board ground of stator 141 or through a flexible leaf (not shown). Alternatively, shield 166 can be made of sheet metal.

Because shield 173 also encloses transmitter plates 172, it confines their electric field and eliminates potential interference from being radiated outside encoder 140. On the other hand, although plates 172 are neither at ground nor at any other fixed potential, they serve as a part of the enclosure that protects the rotor space within the encoder. Considerations relating to shields held at potentials other than ground potential are described in an article entitled "Application of Capacitance Techniques in Sensor Design," by Heerens, in *Journal of Physics E: Scientific Instrumentation* 19 (1986), pp. 897–906, which is incorporated herein by reference.

To summarize, the internal elements of encoder 140 are bi-directionally isolated from the environment by a scheme that has several unique features:

1. A dedicated shield 173 is employed independent of the mechanical housing.
2. The shield provides protection in all directions, and still enables rotational coupling to the rotor inside it.
3. The shield comprises several constituents, including conductive layers 154 on printed circuit substrates 168 and 169 used for the encoder.
4. Some constituents of the shield, such as the transmitter plates, are not necessarily at a fixed potential.

Virtual Grounding of the Rotor

Although grounded-rotor (Type 3) encoders have a number of advantages, all such encoders known in the art require that ground potential be applied to the rotor through physical contact, with a number of attendant disadvantages, as described in the Background of the Invention.

Figure 7:
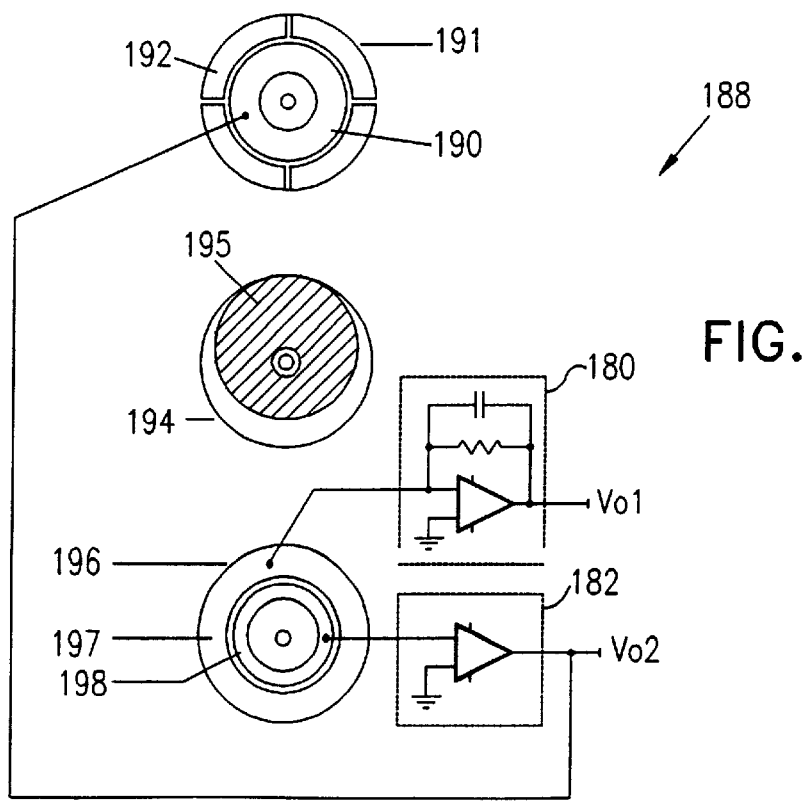
FIG. 7 is a schematic, exploded view of a capacitive rotation angle encoder having a virtually-grounded rotor, in accordance with a preferred embodiment of the present invention.

FIG. 7 is a schematic, exploded view of a capacitive encoder 188, wherein a conductive coating 195 on rotor 194 is effectively (or virtually) grounded without actually being electrically connected to any non-rotating element, in accordance with a preferred embodiment of the present invention. Coating 195 forms a pattern on the surface of rotor 194. For the purposes of this embodiment, it is sufficient that the coated pattern be held at a fixed potential—not necessarily ground or any other specific DC potential. In essence, it is sufficient that the pattern block capacitive interaction between stators 191 and 196 at the frequency of electrical excitation that is applied to transmitting stator 191. Although encoder 188 is shown as a single-pole encoder, any number of poles could be used.

Transmitting stator 191 includes four transmitter plates 192, labeled A, B, C, and D. The plates are excited by respective excitation voltages, as described hereinabove, and interact capacitively with an annular plate 197 on receiving stator 196 and with conductive pattern 195 on rotor 194. As long as pattern 195 is grounded, or otherwise held at a fixed potential, it selectively blocks AC excitation of the four transmitter-plates from interacting with a receiving plate 196 in the areas shaded by the pattern.

Pattern 195 is held at the fixed potential by means of an amplifier 182, which is coupled between an auxiliary annular plate 198 on stator 196 and an auxiliary transmitter plate 190 on stator 191. To the extent that pattern 195 is electrically floating, it acquires an AC potential from transmitter plates 192 in accordance with its instantaneous position. This AC potential interacts with plate 198 to generate a voltage, which is amplified and inverted by amplifier 182. The resulting voltage $V_{o2}$ is applied to plate 190 in order to reduce the voltage on plate 198 via capacitive coupling through conductive pattern 195. The geometry of encoder 188 is such that plate 198 faces only rotor pattern 195, and is hidden from transmitter plates 192 and 190. As a result of the operation of amplifier 182, the AC voltages on plate 198 and on pattern 195 are substantially canceled. The pattern is thus maintained at a fixed potential and serves as a screen that selectively blocks capacitive coupling from transmitter plates 192 to receiver plate 197. The output voltage $V_{o1}$ at the output of a charge amplifier 180 coupled to receiver plate 197 will, therefore, reflect the charge induced in the non-shaded portions of plate 197, as required.

Signal Conditioning

Figure 8:
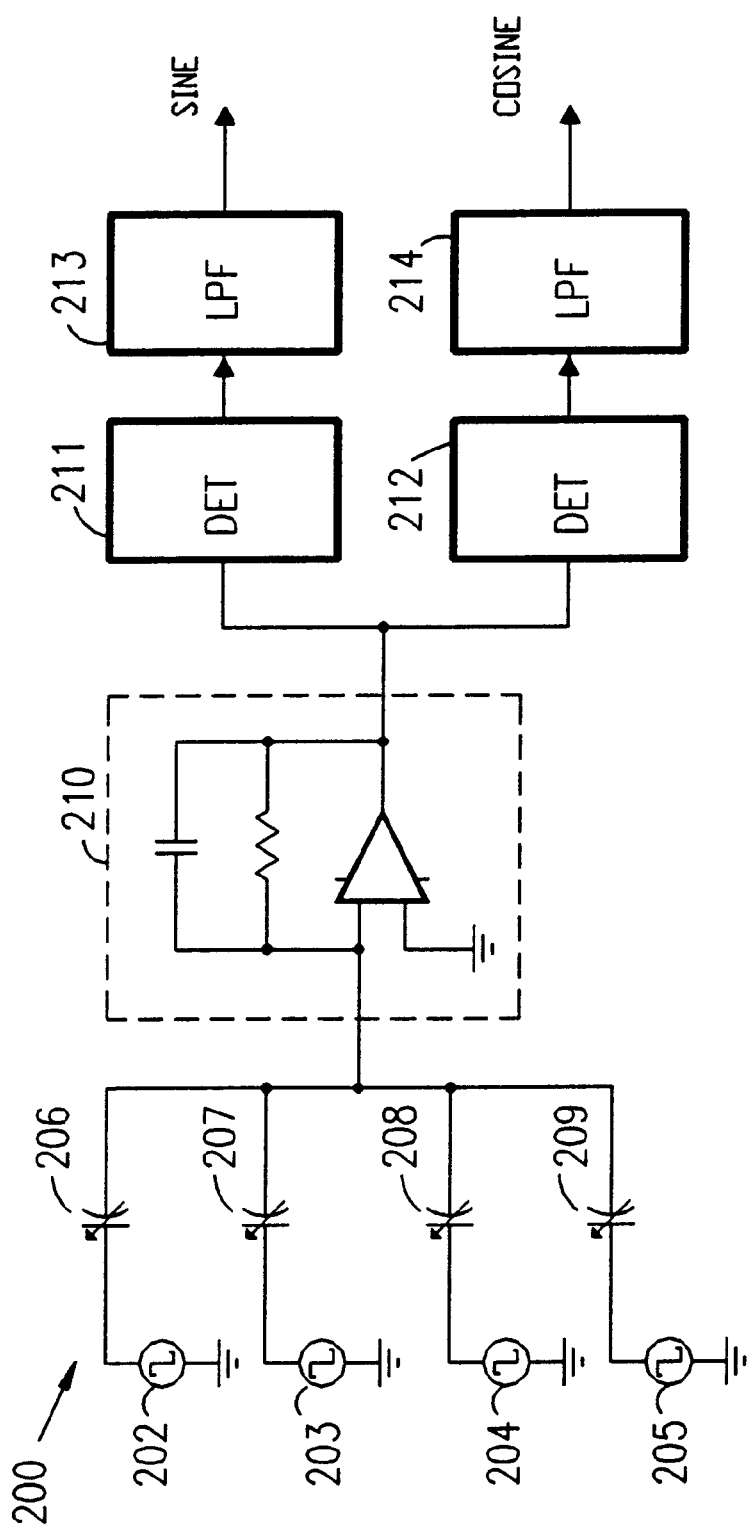
FIG. 8 is a schematic block diagram illustrating a circuit for synchronous, phase/quadrature processing of signals originating from a capacitive rotation angle encoder, in accordance with a preferred embodiment of the present invention.

FIG. 8 is a schematic circuit diagram of a signal conditioning circuit 200, in accordance with a preferred embodiment of the present invention. Circuit 200 is suitable for use with a single-speed CFRAAE, i.e., an encoder that gives only one pair of output signals, as opposed to multi-speed embodiments, described hereinbelow, which have two pairs (coarse and fine) of outputs. Circuit 200 exemplifies a synchronous method of detection for use with phase/quadrature excitation (PQE) of the encoder, which can also be adapted conveniently for use with multi-speed encoder types.

Circuit 200 is preferably used with a transmitting stator having four quadrants, such as stator 52 shown in FIG. 2. Electrical coupling between the quadrants and the receiving stator plate is represented by respective variable capacitances 206 to 209, which are excited by four-phase AC voltage sources 202 to 205, which typically provide 10 kHz square waves in mutual quadrature. A charge amplifier 210 commonly amplifies all four channels. The amplifier output is directed to two identical channels to provide respective sine and cosine outputs.

Each channel includes a synchronous detector 211 or 212 and a low-pass filter 213 or 214. Synchronous detector 211 is fed by an in-phase reference signal from source 202, and its output is filtered by low-pass filter 213 to provide the sine signal. Synchronous detector 212 is fed by a quadrature reference signal from source 203, and its output is filtered by low-pass filter 214 to provide the cosine signal. The sine and cosine signals are preferably digitized and processed by a microcomputer or a digital signal processor (not shown in the figures), as is known in the art. The processing typically comprises a division operation for obtaining the tangent of the rotation angle, and the angle itself is then derived by algebraic calculation or by means of a look-up table.

An advantage of this signal processing scheme, beside its simplicity, is that the gains of all four channels are very nearly the same, regardless of tolerances in the electronic components. Moreover, the DC offset at the outputs is low, which is critical in order to minimize error in the computed output angle.

The PQE approach of circuit 200, with synchronous sine and cosine detection, is unknown in the art of capacitive encoders. Although the above-cited German patent application DE 37 11 062 also uses PQE with a common charge amplifier, the charge amplifier output is then sampled, rather than synchronously demodulated as in the present invention.

Synchronous detectors 211 and 213 are functionally similar to analog multipliers, fed by an input voltage from amplifier 210 and by the respective reference square waves. Low-pass filters 213 and 214 average the output signal over a predetermined bandwidth. The entire operation is equivalent to Fourier analysis, in the sense that the output voltage is proportional to the total energy content of the input voltage in phase with the reference frequency. The signal/noise ratio at the sine and cosine outputs in capacitive encoders known in the art, as described hereinabove, is proportional to the square root of t/T, wherein T is the period of the reference square wave, and t is the aperture time of the sampling, which invariably is much shorter than T. Synchronous detection provides a far superior signal/noise ratio to time sampling, since its output is essentially the average value of many samples over the period T.

Figure 9:
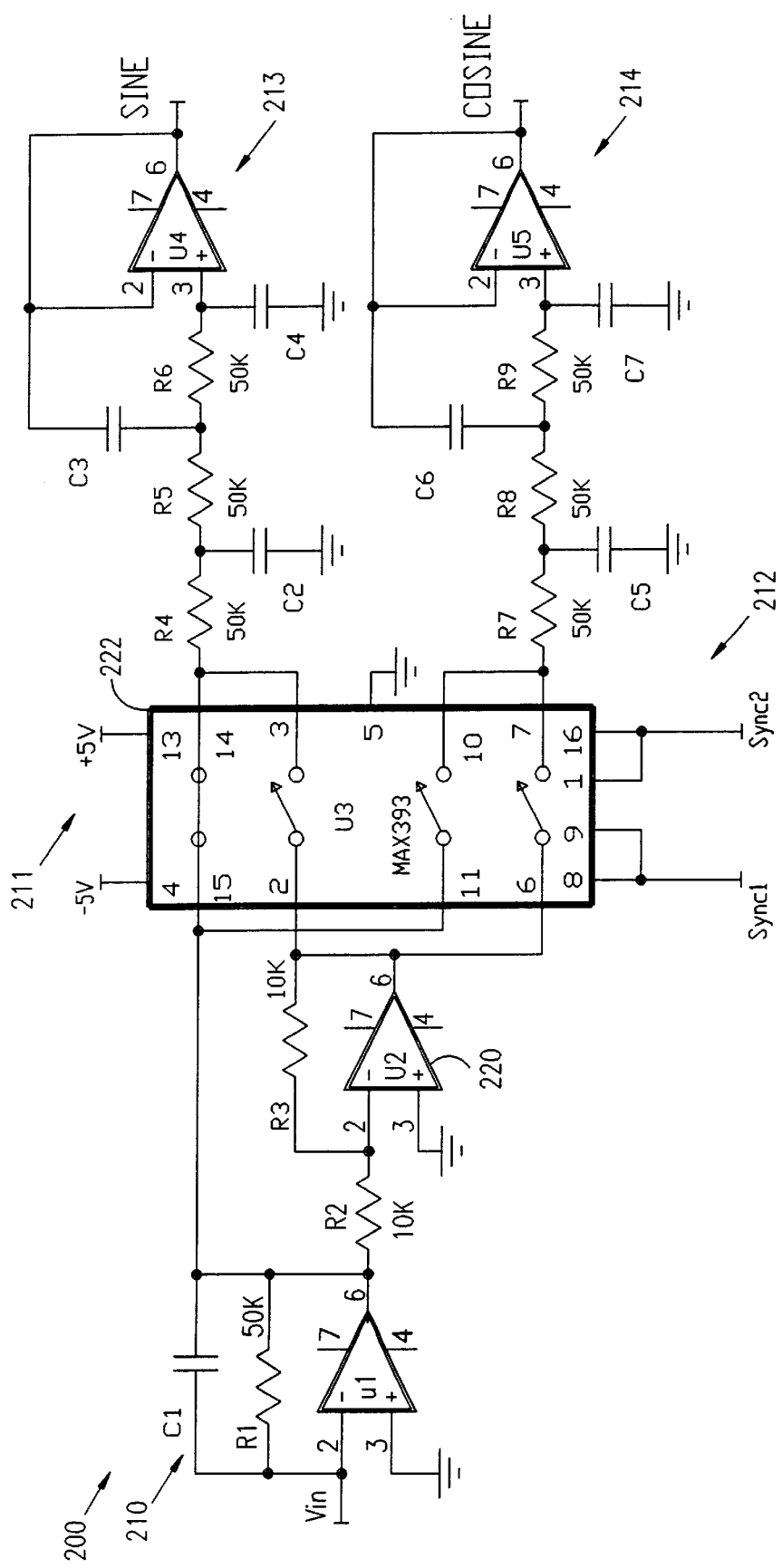
FIG. 9 is a schematic circuit diagram showing details of the construction of the circuit of FIG. 8, in accordance with a preferred embodiment of the present invention.

FIG. 9 is a schematic circuit diagram illustrating an implementation of circuit 200, in accordance with a preferred embodiment of the present invention. $U_1$ serves as input charge amplifier 210, which feeds $U_2$, which is a voltage inverter with a gain of $-R_3/R_2$, wherein essentially $R_2=R_3$. $U_1$ may comprise any suitable type of discrete or integrated FET-input operational amplifier. $U_2$ is a general purpose operational amplifier. $U_3$ is a low charge-injection analog switch, such as a MAX 393, made by Maxim Integrated Products of Sunnyvale, Calif. $U_3$ selects either the output of $U_1$ or $U_2$, as commanded by the square wave pulses Sync1 or Sync2 from sources 202 and 203, respectively. The resulting two outputs are low-pass filtered, preferably by respective third-order Sallen-and-Key active filters, as are well known in the art, each including three resistors, three capacitors, and a voltage follower. Such a filter has a unity gain at low-frequencies, regardless of the tolerances of the passive components. Amplifiers $U_4$ and $U_5$ can be any low-input-offset, low-bias-current operational amplifiers. An alternative type of low-pass filter that provides the desired, stable unity gain is the Zero-DC-Offset Switched-Capacitor type, also well known in the art.

The gains of the sine and cosine processing channels are thus very nearly the same, since they share $U_1$ and $U_2$ and are very insensitive to switch resistance in $U_3$. Overall, the two channels share the same electronic components except for low-pass filters 213 and 214, which, however, have a gain of unity. The actual signal gains can vary, mainly due to variations in capacitor $C_1$ associated with amplifier 210. But since the measured angle is calculated based on the ratio of the two outputs, the gain variation is the same in both channels, and no accurate or stable components are needed. The performance of this signal processing method is very good. For example, a 12 bit analog/digital conversion of the output signals of a 32 pole-pair version was found to provide an angular resolution of 19 bits over a bandwidth of 10 kHz.

Due to the simplicity of circuit 200, particularly by comparison with capacitive position encoding circuitry known in the art, it is possible to mount the discrete circuit elements on the same printed circuit board as is used for the receiving stator, for example, on substrate 141 shown in FIG. 6. In this embodiment, the circuit board is preferably a four-layer printed circuit board, with two signal layers in addition to shield layer 154 and receiving plate 170. In laying out these layers, care should be exercised to maximize the distance between the excitation and signal conductors.

Figure 10:
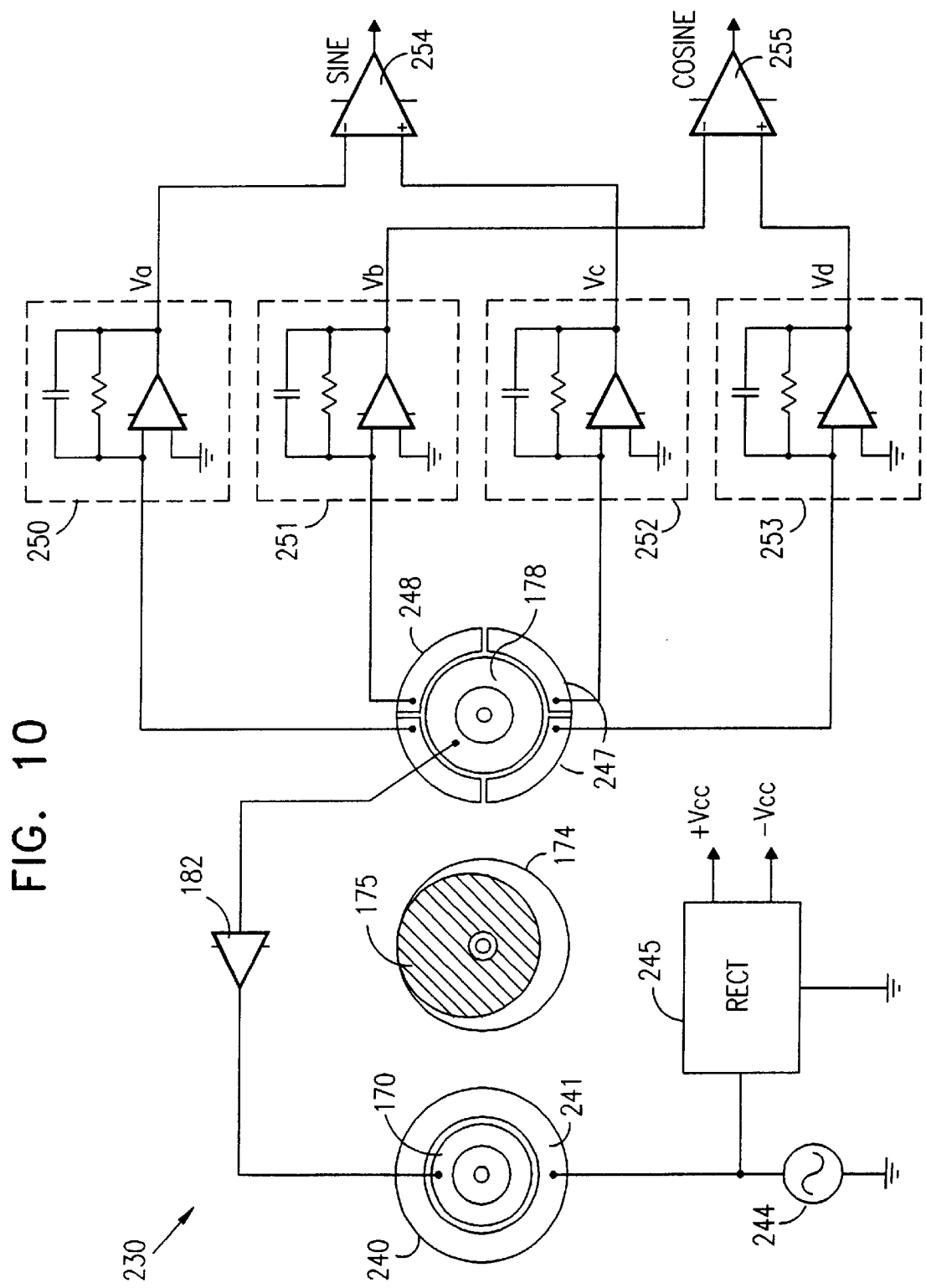
FIG. 10 is a schematic, exploded view of a capacitive rotation angle encoder and circuitry associated therewith, for emulating an electromagnetic resolver, in accordance with a preferred embodiment of the present invention.

FIG. 10 is a schematic exploded view illustrating a capacitive rotation angle encoder 230 and signal processing circuitry associated therewith, wherein the encoder and circuitry are designed to emulate a classical wire-wound resolver, in accordance with a preferred embodiment of the present invention. Encoder 230 is intended to serve as a drop-in replacement for a single pole-pair resolver, i.e., to emulate the input and output behavior of the resolver, while having a much lower profile and reduced manufacturing cost. Since the resolver is a passive element—essentially a variable transformer with an AC input and AC output, while capacitive encoders are active elements with signal processing circuitry, encoder 230 includes a rectification circuit 245, which converts an AC input voltage into plus and minus DC supply voltages for feeding the electronic circuitry.

Encoder 230 receives power from a voltage source 244 comprising an input AC carrier voltage, typically 7V RMS at 7.5 kHz, as is commonly used for resolvers known in the art. This voltage is applied to rectification circuit 245, which supplies plus and minus DC voltages +Vcc and −Vcc to the circuit elements. Preferably, voltage source 244 comprises a dual-voltage doubler, as is known in the art, although any other suitable AC/DC converter circuit may similarly be used. Rotor 174 is preferably virtually grounded, as described hereinabove with reference to FIG. 7. Alternatively, the rotor may be electrically floating, as in a Type 2 or Type 4 encoder. If a Type 4 CFRAAE is used, the rotor pattern is preferably segmented to reduce sensitivity to rotor tilt, as described hereinbelow.

The encoder itself comprises a transmitting stator 240, a receiving stator 248 and rotor 174. Transmitting stator 240 comprises a transmitter plate 241, along with virtual ground auxiliary plate 170. Receiving stator 248 has four receiver quadrant plates 247, labeled A, B, C, and D, along with virtual ground auxiliary plate 178, coupled via virtual grounding loop amplifier 182 to plate 170. The four receiver quadrant plates are connected respectively to four charge amplifiers 250, 251, 252, and 253, which generate corresponding AC output voltages Va, Vb, Vc, and Vd. The amplitudes of the voltages Va−Vc and Vb−Vd, respectively generated by means of differential amplifiers 254 and 255, are proportional to the sine and cosine of the rotation angle, as in an inductive resolver.

The inventor found that encoder 230, when rotated above a certain speed, suffers from a problem that is manifested as random noise added to the output signals. The main spectral component of the noise is at the rotation frequency—typically 50 to 100 Hz. The source of the problem was traced to electrostatic charge accumulated on rotor 174 as a result of air friction. This charge cannot dissipate since the rotor is not electrically grounded. Because the charge is spread randomly on the rotor surface, it induces unequal voltages on receiver plates 247, which appear as output noise. The remedy to this problem is the addition of two band-pass filters (not shown), centered on the excitation frequency, in series with amplifiers 254 and 255. Since the excitation frequency is much higher than the rotation frequency, high selectivity is not needed, and the band-pass filters can be simple Wien-bridge networks. Also, since encoder 230 has four separate signal channels, unlike in the PQE scheme described hereinabove, and gain matching of the channels is not guaranteed, gain equalization is needed in production, typically by resistor trimming.

Multi-Speed Encoders

Single pole-pair CRAAFEs are limited in their accuracy, and those of Type 5 in particular are very sensitive to tilt of the rotor relative to the stator. Multi-pole-pair encoders are, in principle, more accurate and much less sensitive to mechanical imperfections, because their output signals are averaged over the multiple poles. However, they do not provide an absolute position reading unless combined with a single pole-pair encoder as elaborated below.

Although for simplicity, the encoders shown in FIGS. 7–10 are single pole-pair types, the principles embodied therein can similarly be applied to multi-pole and multi-speed encoders. In the context of the present patent application, a multi-speed encoder is defined as one that includes both single-pole and multi-pole variable capacitances. The single-pole capacitance serves as a coarse channel, whose output signals repeat once per revolution, while the fine channel signals repeats several times per revolution. By combining coarse and fine readings, it is possible to obtain a non-ambiguous rotor position with high accuracy and resolution.

Figure 11A:
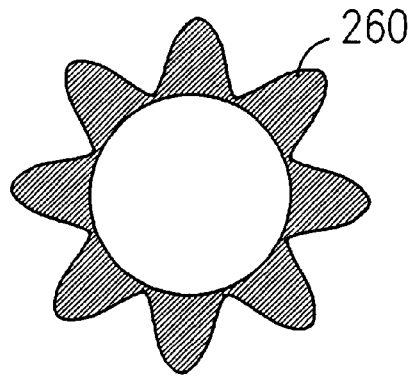
FIG. 11A is a top view of conductive plates on a multi-pole rotor, in accordance with a preferred embodiment of the present invention.
Figure 11B:
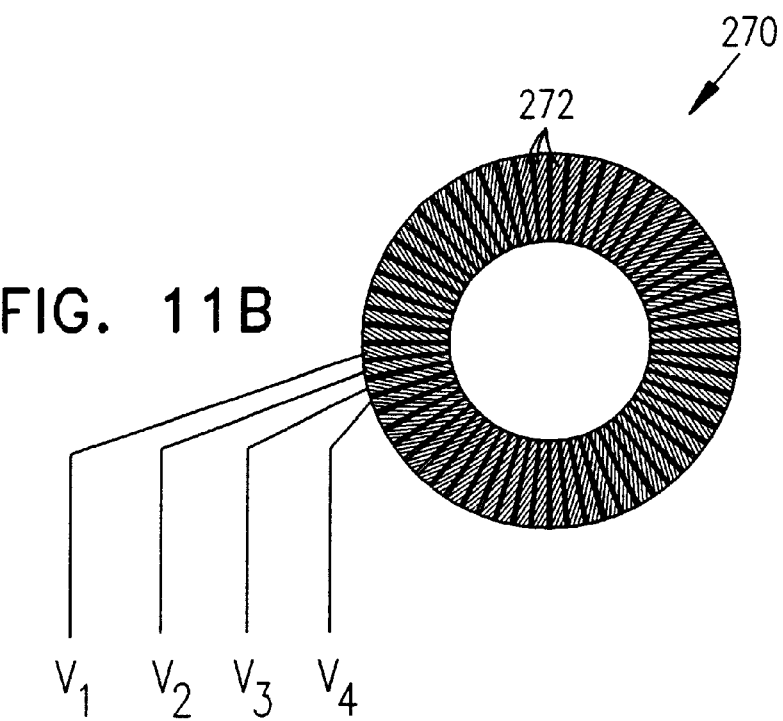
FIG. 11B is an a top view of conductive plates on a stator for use with the rotor of FIG. 11A, in accordance with a preferred embodiment of the present invention.

FIGS. 11A and 11B are, respectively, top views of a multi-pole conductive pattern on a rotor 260 and transmitter plates on a stator 270 of a Type 5 multi-speed capacitive angle encoder, in accordance with a preferred embodiment of the present invention. For simplicity of illustration, coarse channel plates and coupling plates on both the stator and the rotor are not shown in the figures. This encoder, with its single stator 270, is equivalent to an eight-pole resolver. Rotor 260 includes eight sinusoidal cycles. Stator 270 includes 32 transmitter plates 272. Each fourth plate is connected to a common excitation voltage line $V_1$ through $V_4$. The four excitation voltages are in mutual quadrature.

Type 5 multi-speed CFRAAEs, employing a single stator and a single rotor for both channels, have not been proposed in the prior art, perhaps because mutual interference between the two channels has in the past rendered them impractical. This configuration is explicitly dismissed in the above-mentioned article by Arnold and Heddergott.

Figure 11C:
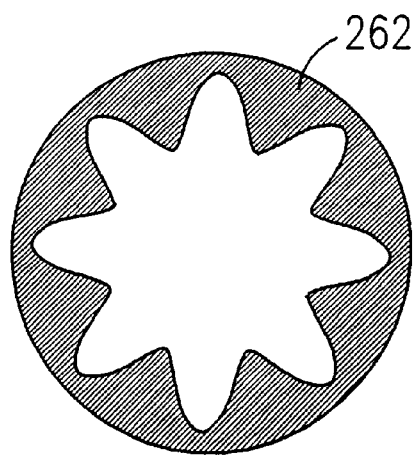
FIG. 11C is an a top view of conductive plates on a rotor for use in place of the rotor of FIG. 11A, in accordance with another preferred embodiment of the present invention.

FIG. 11C is a top view of a different conductive pattern on a rotor 262, which is a negative version of rotor 260, in accordance with a preferred embodiment of the present invention. Rotor 262 is equivalent to rotor 260, except that the signal polarity of the encoder will be opposite.

Figure 12A:
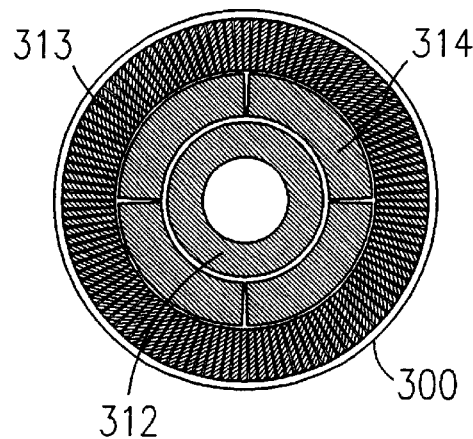
FIG. 12A is an a top view of conductive plates on a stator for use in a two-speed encoder, in accordance with a preferred embodiment of the present invention.
Figure 12B:
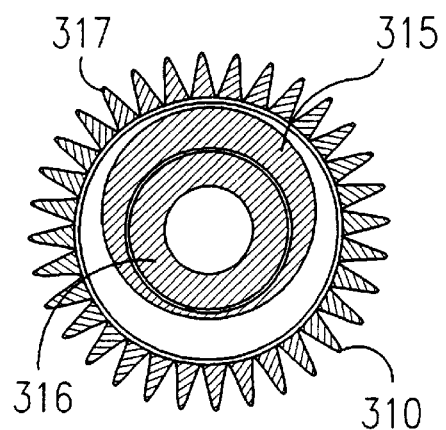
FIGS. 12B and 12C are top views of conductive plates on rotors for use with the stator of FIG. 12A, in accordance with preferred embodiments of the present invention.

FIGS. 12A and 12B are, respectively, top views of conductive plates on a stator 300 and a rotor 310 of a Type 5 (single stator) two-speed encoder, in accordance with a preferred embodiment of the present invention. Stator 300 comprises fine transmitter plates 313, coarse transmitter plates 314 and a receiver plate 312. Rotor 310 comprises fine pattern plate 317 coarse pattern plate 315, and a coupling plate 316 opposite receiver plate 312. All of the rotor plates are interconnected. The separation between plates 315 and 316 is unnecessary and is shown only for purposes of illustration. It is noted that both the coarse and fine patterns on rotor 310 are smoothly varying, without sharp boundary points, unlike multi-speed rotors known in the art. Consequently, when the signals from stator 300 are processed by circuitry as described hereinbelow, the encoder will give smooth, clean sinusoidal outputs, substantially without distortions that could reduce the accuracy of angle measurement.

Figure 12C:
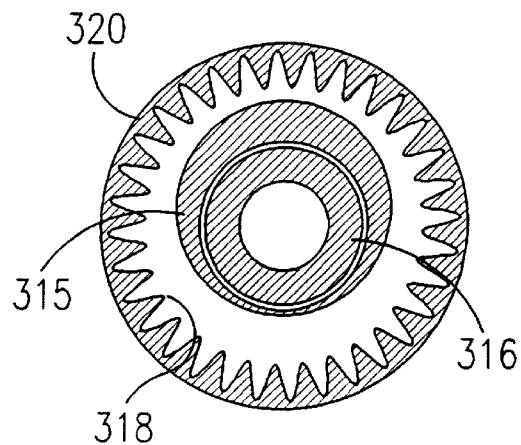

FIG. 12C is a top view of conductive plates on a rotor 320, in accordance with an alternative embodiment of the present invention. Rotor 320 is functionally similar to and can be substituted for rotor 310. it differs in that it has a fine pattern plate 318 that is the "negative" of plate 317 as described above.

Figure 13:
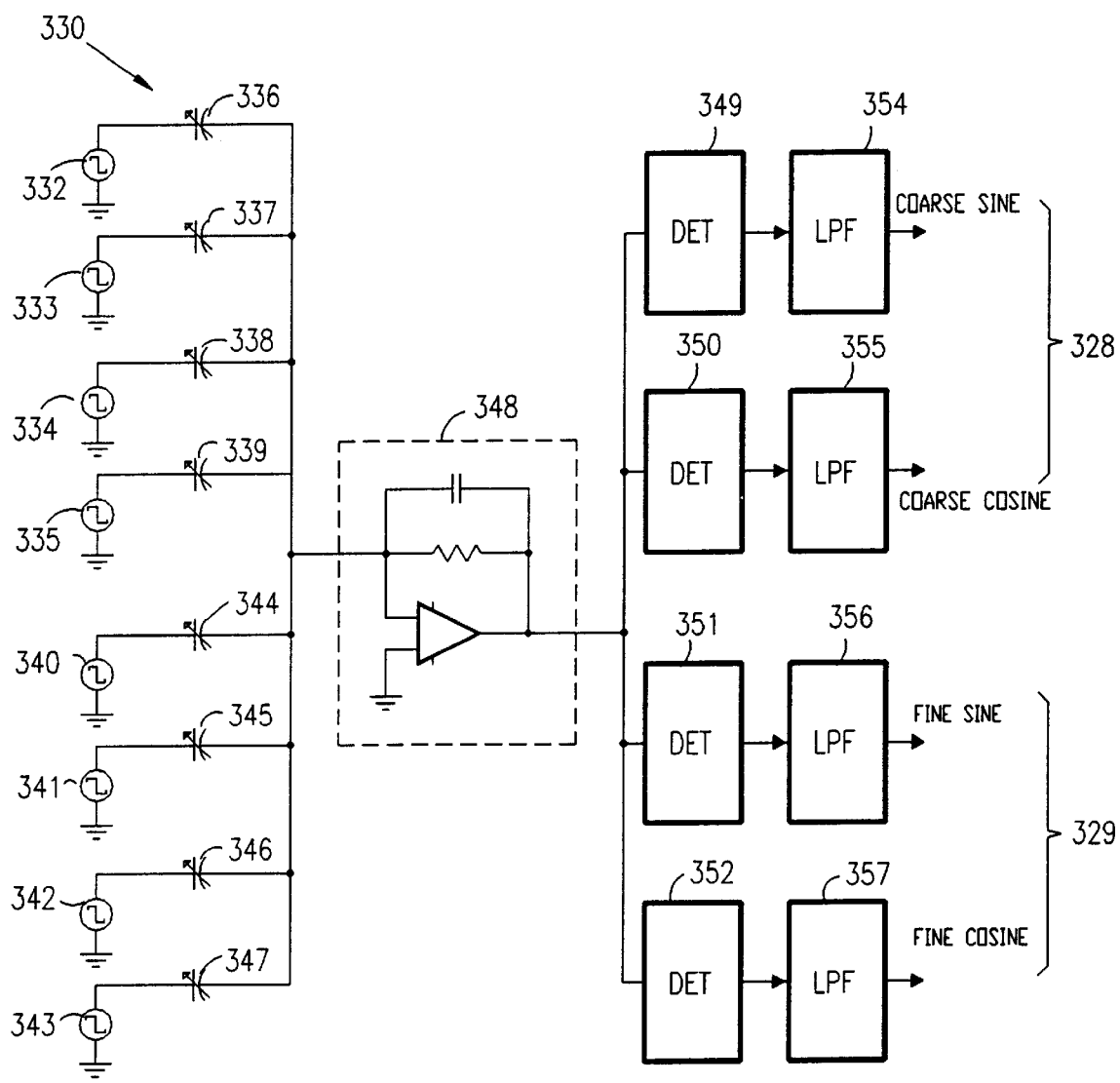
FIG. 13 is a schematic block diagram illustrating a circuit for synchronous, phase/quadrature processing of signals originating from a capacitive rotation angle encoder using the stator of FIG. 12A and the rotor of FIG. 12B, in accordance with a preferred embodiment of the present invention.

FIG. 13 is a schematic diagram of a signal conditioning circuit 330 for use with a two-speed encoder, in accordance with a preferred embodiment of the present invention. Circuit 330 uses a PQE approach, substantially similar to that described hereinabove with reference to circuit 200, but with separate coarse processing channels 328 and fine processing channels 329.

The coarse-channel variable capacitances 336 to 339 are excited by four-phase AC voltages 332 to 335, typically 10 kHz square waves. The fine-channel variable capacitances are depicted respectively by capacitances 344 to 347 and are typically excited by 40 kHz square waves. The electronics include a charge amplifier 348, coupled to receiver plate 312 (FIG. 12A), so as to commonly serve all of the coarse and fine channels. The amplifier output is directed to the coarse and fine processing channels, comprising synchronous detectors 349 to 352 and low-pass filters 354 to 357. Synchronous detectors 349 and 351 are fed by in-phase reference signals 332 and 340, respectively, and are filtered by low-pass filters 354 and 356 to provide the coarse and fine sine signals. Synchronous detectors 350 and 352 are fed by quadrature reference signals 333 and 341, respectively, and are filtered by low-pass filters 355 and 357 to provide the coarse and fine cosine signals. As mentioned hereinabove, these analog signals are then preferably digitized and processed by a microcomputer.

Figure 14:
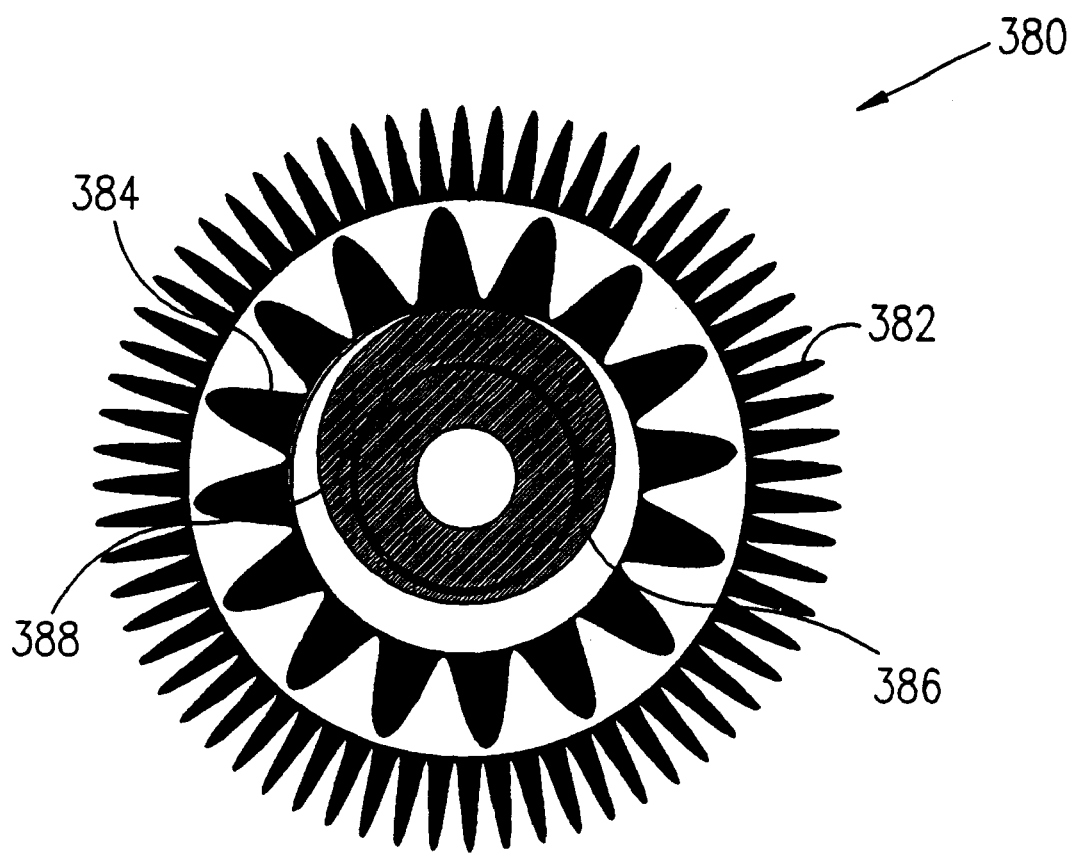
FIG. 14 is a top view of conductive plates on a rotor for use in a three-speed encoder, in accordance with a preferred embodiment of the present invention.

FIG. 14 is a top view of conductive plates on a rotor 380 of a three-speed, Type 5 CFRAAE, in accordance with another preferred embodiment of the present invention. The rotor includes a fine channel 382, a medium channel 384, and a coarse channel 386, along with a coupling plate 388. It is to be used in conjunction with a suitably-adapted stator and signal conditioning circuitry, with three processing channels instead of two. The configuration of FIG. 14 is useful, for example, in large-diameter encoders with many cycles in the fine channel. In such cases, the coarse channel may not be accurate enough to correctly identify the proper fine cycle. The addition of medium channel 384, with a number of cycles intermediate between those of the coarse and fine channels, can solve the problem by first identifying the proper cycle in the medium channel and then in the fine channel.

Figure 15:
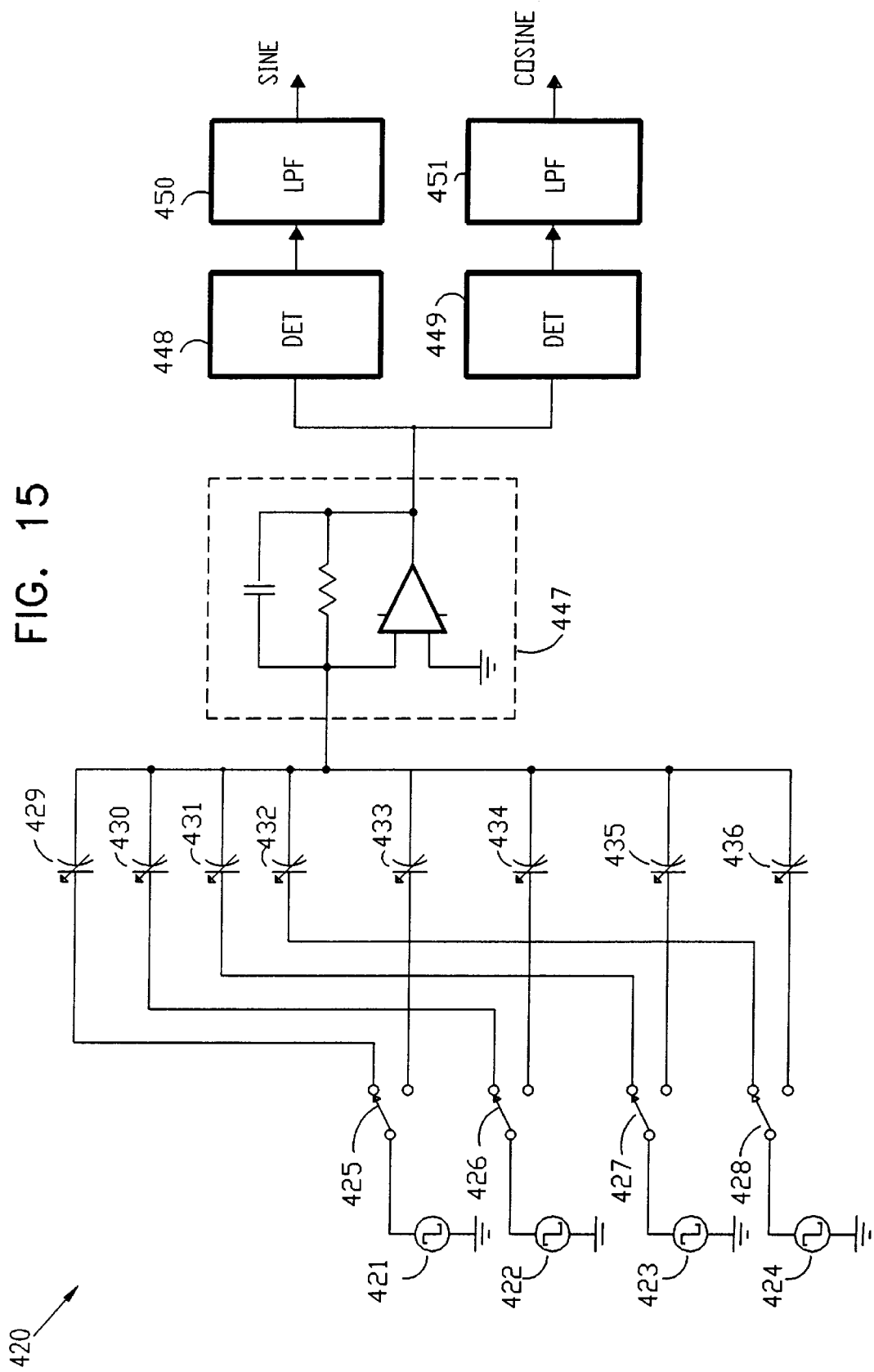
FIG. 15 is a schematic block diagram illustrating a circuit for synchronous, phase/quadrature processing of signals originating from a switched, coarse/fine capacitive rotation angle encoder using the stator of FIG. 12A and the rotor of FIGS. 12B or 12C, in accordance with a preferred embodiment of the present invention.

FIG. 15 is a schematic circuit diagram showing a two-state switchable signal conditioning circuit 420 for use with a two-speed rotary encoder, such as that illustrated by FIGS. 12A–B, in accordance with a preferred embodiment of the present invention. Circuit 420 has the advantages of greater simplicity and reduced component count relative to multi-channel circuits such as that shown in FIG. 13.

Variable capacitances 429 to 432 represent the fine-channel mutual capacitances of the encoder, and variable capacitances 433 to 436 represent the coarse-channel mutual capacitances. Switches 425 to 428 are commanded by a common logic signal (not shown) to apply excitation voltages 421 to 424, or ground potential, to either the fine-channel or coarse-channel capacitances, so that alternately fine and coarse angle readings are made. As described with reference preceding embodiments, a charge amplifier 447 provides an output voltage that is processed by a synchronous detectors 448 and 449 and low-pass pass filters 450 and 451 to provide the sine and cosine outputs for whichever of the channels (fine or coarse) has been switched on.

Preferably, the coarse processing channel is used to identify the absolute position of the encoder. This coarse signal is typically only needed for system initialization. Upon system turn-on, a logic command steers the excitation waveforms initially via switches 425 to 428 to coarse channel transmitting plates (capacitances 433 to 436). The resulting coarse position determination is used identify on which specific fine cycle the rotor is located. From then on, the excitation voltages are steered to the fine channel transmitter plates (capacitances 429 to 432), and the fine channel signals are processed to provide an absolute and accurate rotor position.

Figure 16A:
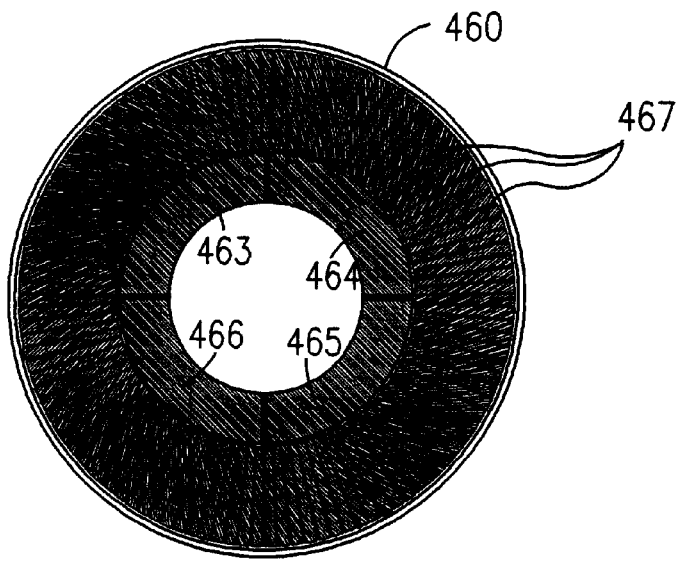
FIG. 16A is a top view of conductive plates on a. stator for use in a two-speed encoder without a coarse pattern, in accordance with a preferred embodiment of the present invention.
Figure 16B:
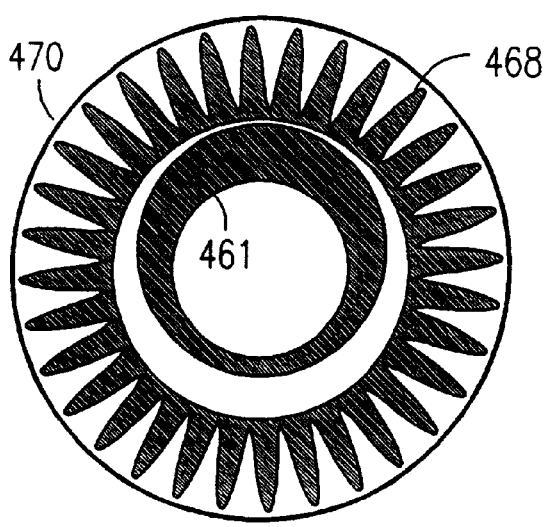
FIG. 16B is a top view of conductive plates on a rotor for use with the stator of FIG. 16A, in accordance with a preferred embodiment of the present invention.

FIGS. 16A and 16B are top views of conductive plates on a stator 460 and a rotor 470, respectively, making up a two-speed Type 5 CFRAAE, in accordance with a preferred embodiment of the present invention. In this embodiment, a multi-pole variable capacitance between the rotor and the stator is used to generate both coarse and fine angle measurements. The resulting practical advantage is that for a given outside diameter of the encoder, a larger center hole can be made, which accommodates a relatively larger range of shaft diameters.

Stator 460 comprises fine transmission plates 467 and quadrant receiver plates 463 to 466. The fine plates interact with a fine pattern plate 468 on rotor 470. An eccentric coupling plate 461 on the rotor couples the interaction to the receiver plates. Because of the eccentricity of plate 461, the coupling capacitance is not rotationally independent unless all four quadrant capacitances are summed. When they are summed, an accurate fine channel reading is obtained. In this case, if the fine-channel output signals are represented as $A=R \sin(n\theta)$ and $B=R \cos(n\theta)$, then their vector sum $R$ is a constant given by:

$$R=\sqrt{A^2+B^2}$$

If not all of the receiver quadrants are employed, however, then the vector sum $R$ is modulated and can thus be used to derive the coarse channel reading.

Figure 17:
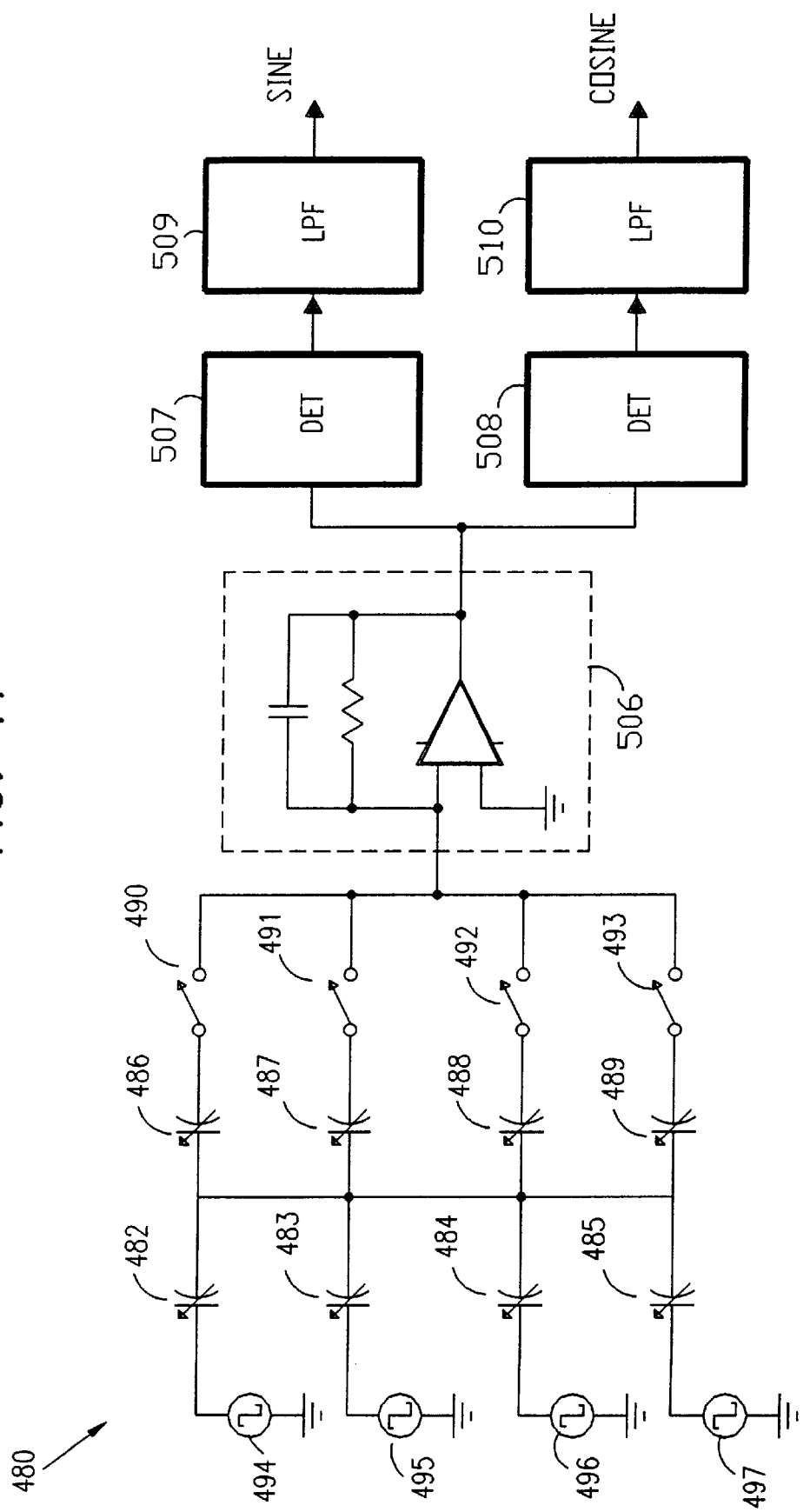
FIG. 17 is a schematic block diagram illustrating a circuit for synchronous, phase/quadrature processing of signals originating from a capacitive rotation angle encoder using the stator of FIG. 16A and the rotor of FIG. 16B, in accordance with a preferred embodiment of the present invention.

FIG. 17 is a schematic block diagram illustrating a signal processing circuit 480 for use with the encoder of FIGS. 16A and 16B, in accordance with a preferred embodiment of the present invention. During an initialization period, preferably while the shaft is stationary, four pairs of DC voltages $A_1$, $A_2$, $A_3$ and $A_4$ and $B_1$, $B_2$, $B_3$ and $B_4$ are obtained from the outputs of the respective sine and cosine channels of circuit 480. This is done by sequentially closing switches 490, 491, 492 and 493, and sampling the output DC voltages that appear at the outputs of filters 509 and 510. Each DC voltage is the result of fine capacitances 482, 483, 484 and 485 and of a specific quadrant coupling capacitance 486, 487, 488 or 489 (corresponding respectively to quadrants 463, 464, 465 and 466 in FIG. 16A), together with the fixed gain of charge amplifier 506, synchronous demodulators 507 and 508 and low-pass filters 509 and 510. The corresponding vector sum of each pair of voltages is then calculated to provide magnitudes $R_1$, $R_2$, $R_3$, and $R_4$, which are proportional to the values of the quadrant coupling capacitances at the particular shaft angle. The diagonal pair differences of $R_1-R_3$ and $R_2-R_4$ are proportional to the desired sine and cosine of the coarse shaft angle.

After this initialization process, the four switches 490 to 493 are closed, whereby the encoder is switched to the fine mode. In this mode, voltage sources 494 to 497 and variable capacitances 482 to 485, due to interaction of the fine stator plates with the fine rotor pattern, are used to determine the fine shaft angle.

Figure 18A:
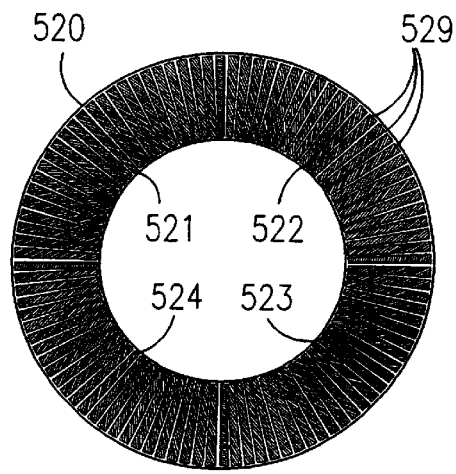
FIGS. 18A and 18C are top views of conductive plates on a transmitting stator and a receiving stator, respectively, for use in another two-speed encoder without a coarse pattern, in accordance with a preferred embodiment of the present invention.
Figure 18B:
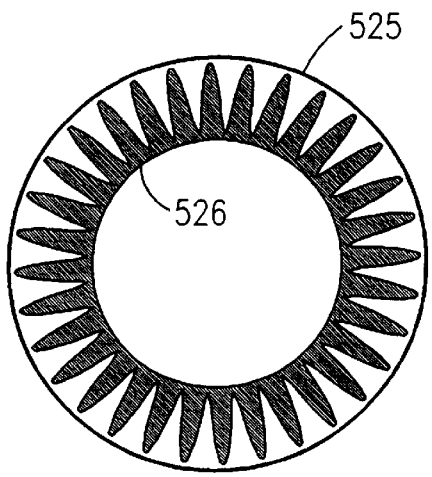
FIG. 18B is a top view of conductive plates on a rotor for use with the stators of FIGS. 18A and 18C, in accordance with a preferred embodiment of the present invention.
Figure 18C:
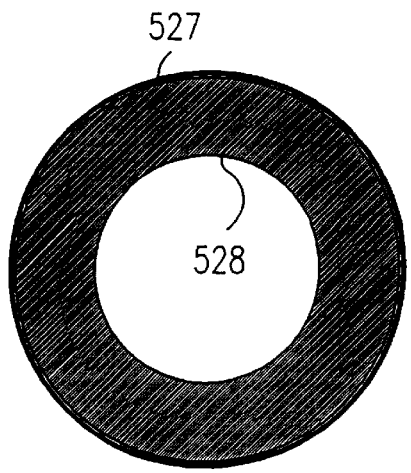

FIGS. 18A, 18B and 18C are top views of a transmitting stator 520, a rotor 525 and a receiving stator 527, respectively, which together make up a Type 4 encoder, in accordance with a preferred embodiment of the present invention. This encoder exemplifies a second scheme for obtaining single-pole signals from a multi-pole mutual capacitance.

Stator 520 includes a multi-pole transmitter array, comprising multiple transmitter plates 529, as in rotor 270 shown in FIG. 11B. In this case, however, plates 529 are divided into four quadrant groups 521 to 524, each of which can be energized separately. Stator 527 includes an annular receiver plate 528. Rotor 525 has a multi-pole conductive pattern 526 on both sides, and the two conductive patterns are electrically connected.

Signals received from receiving stator 527 are processed by a circuit that is generally similar to circuit 200, shown in FIG. 8. In this case, capacitances 206 to 209 represent the variable capacitances due to the group of transmitter plates in each quadrant. As long as plate 526 on rotor 525 has an ideal multi-pole pattern, the output sine and cosine signals from low-pass filters 213 and 214 will represent the fine channels, regardless of whether one or more transmitter quadrants are energized. If, however, the rotor pattern deviates from the ideal, for example, due to eccentricity relative to the rotation axis or to a tilt about the axis or a once-per-cycle variation in its thickness, the output signals will include a once-per-rotation amplitude modulation if not all of the quadrants are energized. Such eccentricity or other deviation can easily be introduced. Thus, if each quadrant is energized in turn and the magnitudes $R_1-R_3$ and $R_2-R_4$ are generated as before, the sine and cosine of the coarse shaft angle are obtained. When all quadrants are energized, the sine and cosine of the fine channel are accurately obtained.

Other equivalent schemes are possible, all having in common a multi-pole rotor with some type of deviation from symmetry that repeats once per revolution, and a stator that can be switched between two configurations: one symmetrical and one having a feature that breaks the symmetry. For example, if a rotor with an ideal multi-pole pattern is used in which a group of one or more cycles is missing, the signal will not be affected when the stator is in the symmetrical (grouped quadrants) mode. The signal amplitude will, however, be modulated with a once-per-revolution rate when the stator is switched to the asymmetrical (single quadrant) mode.

In still other preferred embodiments of the present invention, a multi-pole rotor with a once-per-cycle symmetry defect is coupled to a stator having a similar sort of symmetry defect. In this case, no switching need take place. For example, stator 270 (shown in FIG. 11B) may be decentered, or one segment 272 of the stator may be removed. Mutual interaction of the rotor and stator defects lead to a cyclic modulation of the signal magnitude $R$. During an initialization period, as the rotor turns, $R$ is monitored in order to identify the position where it reaches its maximum or minimum value. This position is defined as the index position of the rotor. Thereafter, during normal operation, the cyclic error in the fine signal, which is associated with the above-mentioned cyclic modulation, is preferably corrected in order to provide an accurate, absolute reading. Such embodiments have the advantage that the center hole of the rotor can be made still larger, since only the fine pattern is required, without a coupling or coarse pattern plate.

Segmented and Three-Dimensional Rotors

FIG. 19 is a schematic, pictorial view of a rotor 520 having a three-dimensional conductive pattern, in accordance with a preferred embodiment of the present invention. In this embodiment, the rotor is cut out along the conductive pattern, forming a plurality of radial extensions 522 from a solid central portion 526 and with intervening open recesses 524 between the extensions. This rotor design is particularly advantageous in an encoder that must operate in a humid or damp environment. If the rotor faces are flat, as is generally practiced in the art, moisture can form a film that swamps the conductive pattern, so that the encoder ceases to function. When rotor 520 is used, performance is the same regardless of whether there is a water film, and the rotor continues to give accurate readings. In fact, the signal level increases, since the difference in capacitance per unit area between the patterned and open areas is larger than otherwise. Although open recesses 524 are only applicable to the fine channel, this channel is the most crucial to the performance of the encoder. According to one embodiment of the present invention, the coarse channel pattern is partly recessed by making the substrate thinner, so as to reduce moisture effects by making the capacitance per unit area in the recessed pattern smaller than in wet, non-recessed areas.

The above-mentioned European patent application 0226716 describes a Type 4 capacitive encoder with a three-dimensional rotor pattern, which is intended to improve the accuracy of electrostatic field distribution in the encoder. The application does not relate to moisture effects, and the recesses of the pattern described therein are closed. For this reason, rotor 520 is superior to three-dimensional rotors known in the art, particularly in grounded-rotor (Type 3) embodiments, in which the grounded water film will serve as a continuous screen, regardless of whether the rotor pattern is partly recessed or not. The design of rotor 520 is also useful in Type 4 encoders.

The substrate of rotor 520, as well as of rotors of other designs described herein, can be made of any suitable non-conductive material, which, where applicable, is coated with a conductive pattern, such as copper-clad glass-epoxy, or vacuum-metallized glass discs. Preferably, the rotor disc and central portion 526 constitute a single part, which is molded from reinforced plastic, such as glass-filled polycarbonate. One preferred method for selectively applying the conductive coating on the rotor in this embodiment uses a process known as hot-stamping, wherein a thin metal film is selectively transferred from a continuous roll to the substrate and is coated thereon by pressure of a patterned hot plate. In a preferred embodiment, the pattern is first formed in relief on the injected substrate, which is then coated using a flat, non-patterned hot plate. An advantage of such a molded rotor is that it guarantees an accurate and consistent registration of the pattern relative to the rotating shaft.

In another preferred embodiment of the present invention (not shown in the figures), an external rim of the rotor is slightly raised above the level of the patterned portion. The raised portion serves as a spacer, which prevents contact between the patterned portion and the facing stator plate so as to avoid damage to the coating prior to establishment of proper separation between the stator and rotor in final assembly of the encoder. A further advantage of the raised pattern is evident under high-humidity conditions, in which a water film may form on the rotor, as described hereinabove.

Still another option is to make the conductive region of the rotor from a carbon-filled or other conductive polymer, which is co-injected with a non-conductive polymer for the other parts of the rotor.

An important feature, desirable in any rotation sensor, is insensitivity to mechanical displacement of the rotor other than rotation, such as displacement due to eccentricity or tilt relative to the rotation axis, or to axial mounting errors. All CFRAAEs in accordance with preferred embodiments of the present invention are largely insensitive to axial mounting errors, since such errors, at most, would affect the common gain of the sine and cosine channels, but not their ratio, which determines the computed angle. The signal in a multi-pole capacitive encoder is a combined contribution of the many poles. As a result, such an encoder, unlike optical encoders, exhibits significant self-compensation and tolerance to both tilt and radial misalignment of the rotor relative to the stator.

A single-pole CFRAAE, however, by its very nature is sensitive to rotor eccentricity errors. Its sensitivity to tilt error depends on its type, Types 2 and 3 being the least sensitive. Since a Type 4 CFRAAE has the advantage of simplicity, it would be particularly desirable to improve its insensitivity to rotor tilt.

Figure 20:
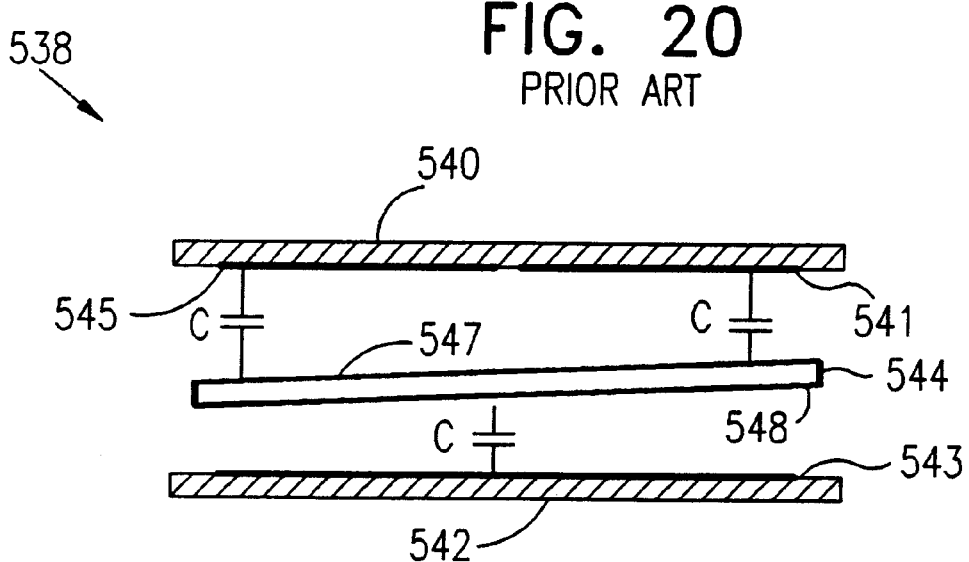
FIG. 20 is a schematic, sectional illustration of a capacitive rotation angle encoder as is known in the art, illustrating the effect of rotor tilt on encoder accuracy.

FIG. 20 is a schematic, sectional view of a Type 4 CFRAAE 538, as is known in the art, illustrating the effect of rotor tilt. Encoder 538 includes a first stator 540 with transmitter conductive pattern coatings 541 and 545; a second stator 542 with a receiver conductive coating 543; and a rotor 544, which is slightly tilted, with electrically interconnected conductive coatings 547 and 548. The narrower air gap on the right side of the encoder between stator 540 and rotor 544 increases the contribution of transmitter pattern 541 relative to pattern 545 to the overall signal received by stator 542. The difference in contributions affects the gain ratio between the two channels, resulting in an output error. Although the capacitance between rotor 544 and receiver coating 543 is also modified by the tilt, this effect is common to both contributions and does not influence their gain ratio.

Figure 21:
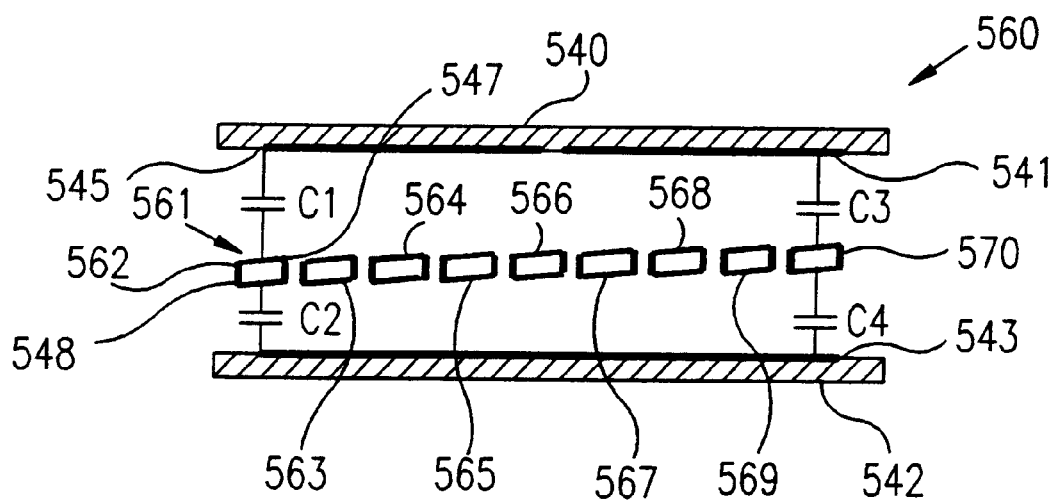
FIG. 21 is a schematic, sectional illustration of a capacitive rotation angle encoder having a segmented rotor, in accordance with a preferred embodiment of the present invention.

FIG. 21 is a schematic, sectional view of a Type 4 CFRAAE 560, in accordance with a preferred embodiment of the present invention. The conductive patterns on the two sides of a rotor 561 are segmented into multiple elements 562–570, which are mutually electrically insulated. The two faces of each element, with respective coatings 547 and 548, are electrically interconnected. In this case, neglecting fringing field effects, the series connection of capacitances $C_1$ and $C_2$, between coating 545 and rotor element 562 and between the rotor element and coating 543, respectively, is substantially independent of the position of the rotor element 562. The series connection of capacitances $C_3$ and $C_4$ associated with element 570, as well as of the capacitances associated with the other rotor elements, are likewise substantially position-independent. Hence, the total capacitance of the pattern is largely independent of the tilt.

Figure 22:
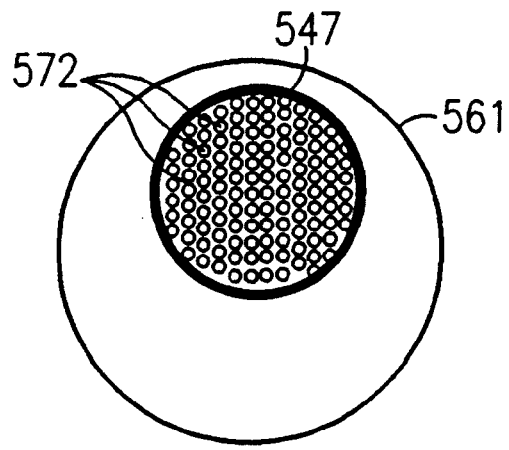
FIG. 22 is a schematic top view of a single-pole rotor employing the segmentation shown in FIG. 21.

FIG. 22 is a schematic top view of rotor 561, in accordance with a preferred embodiment of the present invention. The figure illustrates segmentation of coating 547 into multiple segments 572, which are configured in the manner of segments 562–570, shown in FIG. 21, in a single pole-pair construction. U.S. Pat. No. 4,851,835 describes a segmented construction of the multi-pole pattern on a rotor for a Type 4 CFRAAE. But improvement of immunity of the encoder to rotor tilt is of minor significance in this case, since the multi-pole rotor is inherently insensitive to tilt because of self-compensation of the individual poles, as described hereinabove. Unlike encoders known in the art, the present invention provides enhanced tilt immunity in single pole-pair rotor 561.

Figure 23:
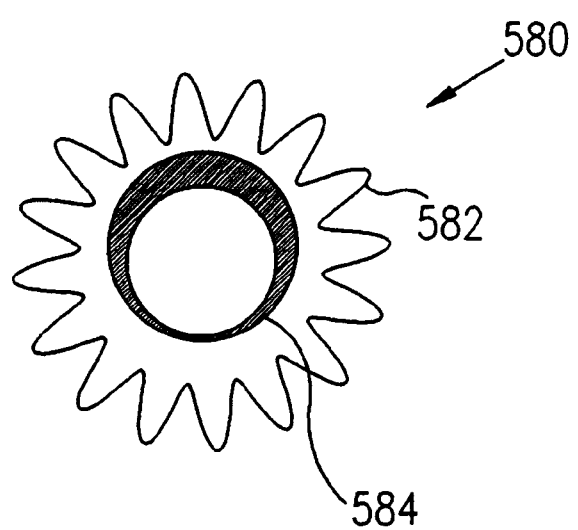
FIG. 23 is a schematic top view of a hybrid-type rotor for use in a two-speed capacitive rotation angle encoder, in accordance with a preferred embodiment of the present invention.

FIG. 23 is a schematic top view of a hybrid rotor 580, which combines two CFRAAE types in a single device,, in accordance with a preferred embodiment of the present invention. Rotor 580 comprises a dielectric substrate which is molded to give a three-dimensional, multi-pole fine channel pattern 582. This pattern is, therefore, of Type 2. A conductive pattern 584, preferably segmented, as described hereinabove, is formed on the rotor substrate to serve as the coarse channel. The coarse pattern thus functions as a Type 4 CFRAAE. Other combinations of different types are also possible.

Capacitive Linear Displacement Encoders

The concepts described hereinabove in relation to rotation angle measurement can also be applied to capacitive linear displacement encoders (CLDE). Such encoders include a fixed element—a ruler—which spans the entire range of motion, and a moving element, typically made as short as practical and referred to as a reading head. Although the ruler can be shielded, for example, by a conductive bellows or by other means, as described hereinbelow, it is usually more convenient to shield the much shorter head. It is therefore preferable, although not essential, that the head portion of the CLDE include the receiver. Unlike the multipole-pair CFRAAE, with its self-compensation of tilt error, the CLDE lacks circular symmetry and is not inherently insensitive to relative tilt between the ruler and head. Preferred embodiments of the present invention are designed to overcome this shortcoming.

Figure 25:
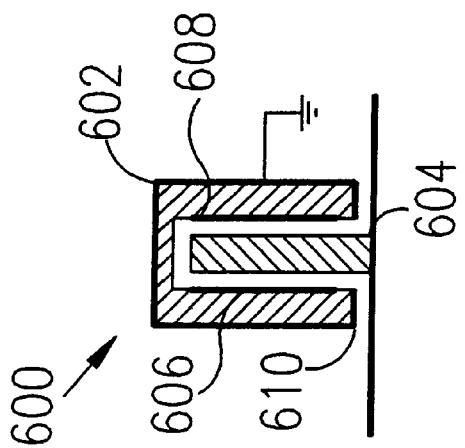
FIG. 25 is a schematic, sectional view of the encoder of FIG. 24, taken along a line XXV—XXV.
Figure 24:
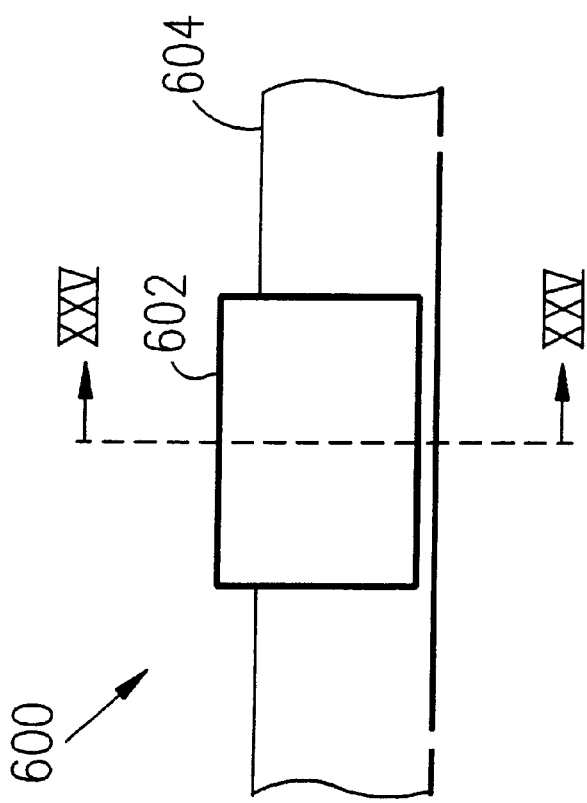
FIG. 24 is a schematic side view of a capacitive linear displacement encoder, in accordance with a preferred embodiment of the present invention.

FIGS. 24 and 25 are schematic illustrations of a CLDE 600 with a two-plate reading head 602, in accordance with a preferred embodiment of the present invention. FIG. 24 is a side view showing the basic configuration of the encoder, which can be implemented as a Type 2, 3 or 4 encoder. FIG. 25 is a schematic, sectional view taken along a line XXV—XXV in FIG. 24, showing the Type 2 implementation by way of example.

CLDE 600 comprises a ruler 604 along with head 602. As seen in FIG. 25, the head includes a receiver plate 606 and a transmitter plate 608. In the Type 2 implementation, ruler 604 is made from a dielectric material and includes a repetitive three-dimensional edge, preferably sinusoidal in shape, rather than a straight edge. In the Type 3 or 4 CLDE, as described hereinbelow, the pattern is printed with a conductive coating on the ruler. The ruler pattern may be three-dimensional, in analogy to the three-dimensional rotor pattern shown in FIG. 19, although in this case it will be necessary for mounting purposes to grasp the ruler along its centerline, rather than at the bottom as shown in FIGS. 24 and 25. Preferably, head 602 is protected from electrical interference by a grounded external shield 610.

FIG. 26A is a schematic side view of a reading head 604 of a Type 1 CLDE, in accordance with a preferred embodiment of the present invention. The Type 1 CLDE includes transmitter plates on the ruler and a single receiver plate on head 604 having a symmetrical double-sinusoid pattern 612. The double sinusoid is symmetrical about two axes. Therefore, errors due to head tilt around a longitudinal axis parallel to the direction of motion, as well as rotation around an axis perpendicular to the air gap between the head and the ruler, are substantially self-compensatory. The use of pattern 612 thus reduces head tilt sensitivity of encoder 600 relative to prior art CLDE devices. Errors due to tilt around an axis perpendicular to the direction of motion are minimized in proportion to the number of cycles in the pattern.

FIG. 26B is a schematic side view of a reading head 620, in accordance with another preferred Type 1 embodiment of the present invention. In this case, a symmetrical, double sinusoid receiver pattern 622 is protected against external interference by conductive grounded layers 621 and 623 on either side thereof.

FIG. 27 is a schematic, side view of a Type 1 CLDE ruler 602, having a transmitter plate 608, in accordance with a preferred embodiment of the present invention. Ruler 602 is preferably used in conjunction with head 604 or 620. The transmitter plate comprises a pattern of multiple bars 624, which are excited by four-phase AC voltages, preferably square waves, as described hereinabove with reference to CFRAAE embodiments. PQE excitation is preferably employed, along with the single-channel detection and demodulation scheme shown in FIG. 8, so as to reduce sensitivity of CLDE 600 to component tolerances and provide substantially equal gains in the sine and cosine channels.

FIG. 28 is a schematic, side view of a double sinusoid pattern 632 on a ruler 630 used in a Type 4 CLDE, in accordance with another preferred embodiment of the present invention. Although grounding shield 610 (FIG. 25) is generally sufficient to prevent electrical interference from entering reading head 602 in Type 2 and 3 CLDEs, in the Type 4 CLDE a continuous conductive pattern on the ruler could pick up interference and couple it to receiver 606. As shown in FIG. 28, this susceptibility to interference is greatly reduced by segmenting pattern 632 with inclined gaps 634. The segments of the pattern that are active at any moment are, therefore, shielded inside head 602 and are insulated from unprotected segments outside shield 610. Because gaps 634 between the segments are inclined, the sinusoidal dependence of the measured capacitance as a function of head travel is not impaired. Vertical gaps, as are known in the art, would introduce discontinuity in the sinusoidally-varying capacitance due to the pattern. Thus, the use of pattern 632 enhances the achievable interpolation depth, and consequently the accuracy of the encoder, compared to CLDE devices known in the art.

Figure 29:
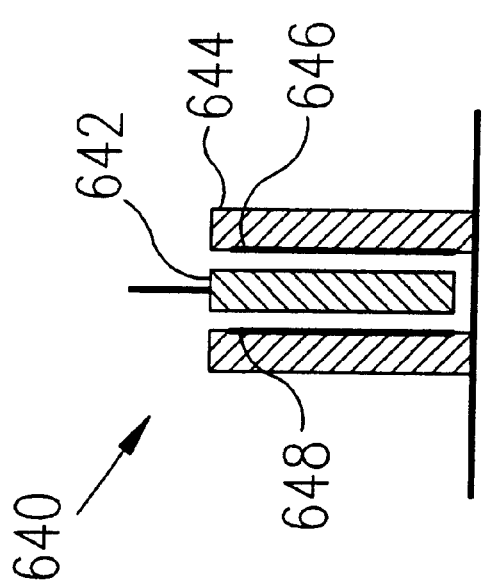

FIG. 29 is a schematic, sectional illustration of another CLDE 640, in accordance with a preferred embodiment of the present invention. The construction of CLDE 640 is "inverted" relative to CLDE 600 (FIGS. 24 and 25), in that it comprises a stationary ruler 644, which has a receiver plate 646 and a transmitter plate 648 adjoining a longitudinal slot therein. A moving head 642 rides inside the slot. The inverted construction is useful when the moving head cannot be accessed electrically or must be electrically passive for some other reason.

Figure 30:
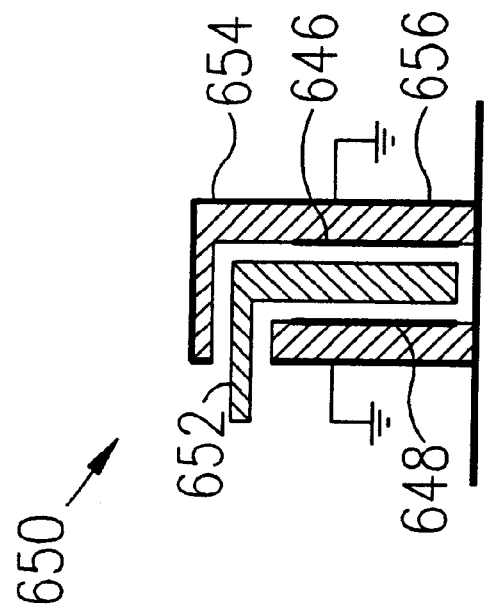
FIGS. 29 and 30 are schematic, sectional views of capacitive linear encoders, in accordance with preferred embodiments of the present invention.

FIG. 30 is a schematic, sectional illustration of a shielded inverted CLDE 650, in accordance with still another preferred embodiment of the present invention. Ruler 654 has a longitudinal slot with a labyrinthine shape, and includes a grounded shield 656 to protect plates 646 and 648 and head 652. CLDE 650 is similar in principle to CLDE 640, but is generally more resistant to external interference.

Preferably, both ruler 644 and head 642 (FIG. 29) comprise printed circuits, based on multi-layer printed circuit technology using conventional FR-4 substrate material. Typically, the front layer of the ruler printed circuit board includes transmitter plate(s) 648, and the inner layers include excitation lines and a shielding ground plane. Similar technology can be used in the other preferred embodiments described herein. In Type 1 and Type 5 embodiments of the present invention, in which the ruler comprises a single transmitter (or receiver) plate, and the back side of the ruler, away from the head, is free, the ruler can be made from a thin multi-layer substrate, which can then be bonded to the machine in which the encoder is employed. If this flexible ruler is bonded to a cylindrical surface, it enables angular measurements to be made. Another possibility is butting several ruler elements, such as of the type shown in FIG. 28, in series. Since the obtainable accuracy of the butting cannot match the accuracy of CLDE, a calibration process is preferably used in order to store the positioning errors of the elements.

In a typical implementation of a preferred embodiment of the present invention, the ruler was made from an FR-4 strip 0.3 mm thick, 12 mm wide and 500 mm long. The cycle length of the head pattern was 2 mm, and the measured resolution was 0.1 μm.

Figure 31B:
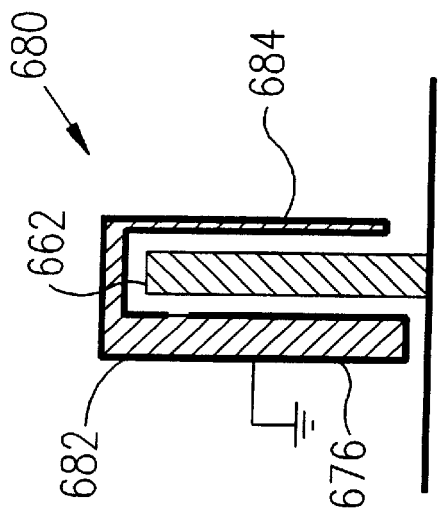
FIGS. 31A and 31B are schematic, sectional views of capacitive linear encoders, in accordance with other preferred embodiments of the present invention.
Figure 31A:
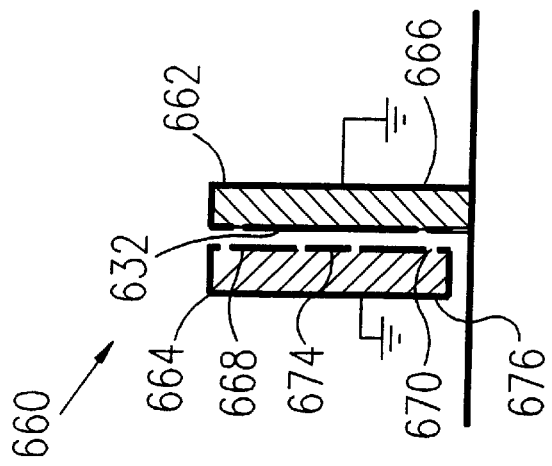

FIG. 31A is a schematic, sectional illustration of a Type 5 CLDE 660, in accordance with a preferred embodiment of the present invention. The CLDE includes a ruler 662 and a moving head 664, which has transmitter plates 668 and 670 and a receiver plate 674 on its inner surface. Preferably, the inner face of ruler 662 has a segmented pattern, such as pattern 632, shown in FIG. 28. Although the pattern is segmented to minimize interference pick up, as explained above, the receiver plate of the head is not protected by an opposite plate, as in CLDE 600 (FIG. 25). Therefore, the back side of ruler 662 is coated with a grounded coating 666, in order to protect the segments which are opposite receiver plate 674 from external interference. For the same purpose, head 664 has a grounded coating 676 on its outer surface.

FIG. 31B is a schematic, sectional illustration of another Type 5 CLDE 680, similar in principle to CLDE 660, in accordance with a preferred embodiment of the present invention. In CLDE 680, the ground protection is provided by an extension 684 of a moving head 682. It is therefore not necessary that ruler 662 include a ground connection.

Figure 32:
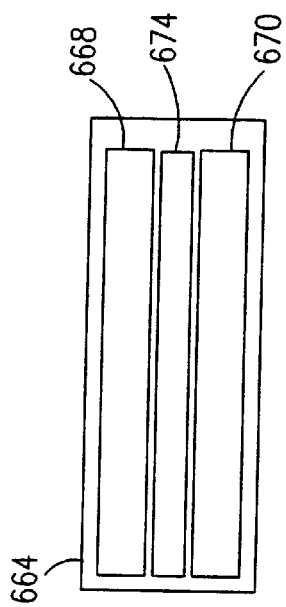
FIG. 32 is a schematic side view of a reading head in the encoder of FIG. 31A, showing transmitting and receiving plates thereon, in accordance with a preferred embodiment of the present invention.

FIG. 32 is a schematic side view of head 664 showing the arrangement of transmitter plates 668 and 670 and receiver plate 674 thereon. The transmitter plates preferably comprise bars, as shown in FIG. 27, which are arranged in upper and lower rows on either side of receiver plate 674, which is capacitively coupled to the central portion of ruler pattern 632 (FIG. 28). The symmetrical construction of the head and the pattern helps to minimize sensitivity of the CLDE to head tilt and rotation. The preferred signal-conditioning scheme for the CLDE is a PQE scheme of the type shown in FIG. 8.

The principles embodied in the CLDE of FIG. 32 can also be implemented in a Type 6 configuration (not shown in the figures). In this case, the head includes two circuit substrates with transmitter and receiver plates, one such substrate on either side of the ruler. Similarly, the ruler has a pattern, such as pattern 632, on both of its sides, wherein the two patterns are electrically interconnected. This implementation has the advantages of improved immunity to interference, increased signal gain, and reduced sensitivity to head tilt.

Figure 33A:
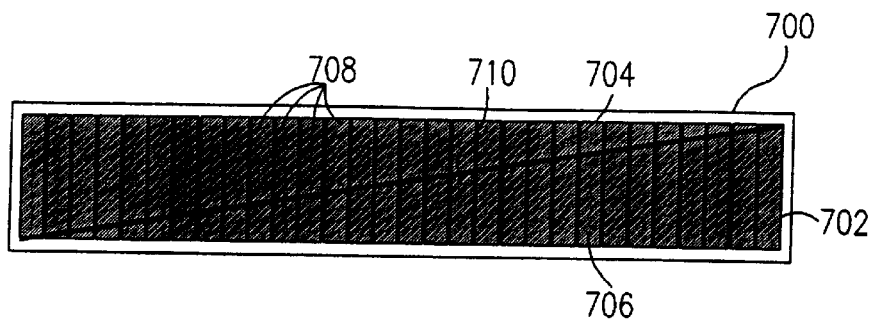
FIGS. 33A and 33B are schematic side views of a ruler and a reading head, respectively, of an absolute-reading capacitive linear encoder, in accordance with a preferred embodiment of the present invention.
Figure 33B:
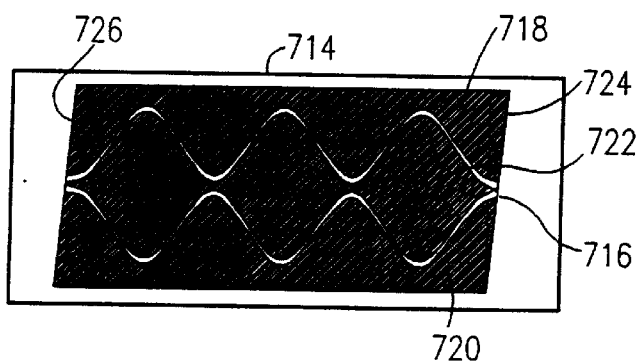

FIGS. 33A and 33B are schematic, side views of a ruler 700 and a head 714, respectively, of a Type 1 absolute CLDE, in accordance with a preferred embodiment of the present invention. The CLDE in this case is similar in structure to CLDE 660 (FIG. 31A), and similar in operation to the switchable, two-speed CFRAAEs described hereinabove. It can thus be switched between a coarse mode, which provides the absolute position of head 714 relative to ruler 700, and a fine mode, equivalent in operation to incremental CLDE 660. As long as the reading error in the coarse mode is smaller than the length of a fine channel cycle, the coarse and fine readings can be combined to provide an absolute displacement reading with an accuracy and resolution limited only by the fine channel.

As shown in FIG. 33A, a transmitter pattern 702 on ruler 700 is substantially similar to that shown in FIG. 27, except that individual bars 708 of the pattern are split by a diagonal separation line 710 to form two triangular groups 704 and 706. Bars 703 in each group 704 and 706 are separately fed with four PQE lines and can be switched so as to function as individual, vertical bars or as collective, triangular transmitters. Head 714 has a pattern 716, which is preferably similar to pattern 622 shown in FIG. 26B.

For fine mode operation, with incremental position determination, the respective PQE lines of the two portions of each bar 708 are interconnected, and incremental CLDE operation is obtained. Upper and lower areas 718 and 720 of pattern 716 on head 714 are disconnected from a central, sinusoidal portion 722 and are connected to ground, as described hereinabove with reference to FIG. 26B.

In coarse mode, to obtain absolute position readings, all of the partial bars in each of the two groups 704 and 706 are interconnected. The upper and lower areas of the reading head are disconnected from ground and interconnected to portion 722, thus forming a quadrilateral plate. If the capacitance between reading head 714 and triangular group 704 is $C_1$, and the corresponding capacitance to group 706 is $C_2$, then difference $C_1-C_2$ is proportional to the displacement of the head relative to ruler 700. In order to minimize any ripple in the measured output in the coarse mode due to the gaps between bars 708, leading and trailing edges 724 and 726 of the reading head are preferably skewed, so that the plate assumes a parallelogram form.

The accuracy of the coarse channel determines the maximum number of fine cycles that can be identified. Therefore, for a given cycle length of the fine pattern, the coarse channel accuracy determines the total measurement length. Equivalently, for a given measurement length, the coarse channel accuracy determines the minimum fine cycle length and thus, the obtainable resolution. To maximize the accuracy of the coarse channel, two major error sources are preferably minimized:

1. Tolerance in the air gap between ruler 700 and head 714, which affects both $C_1$ and $C_2$. Since the air gap equally affects $C_1$ and $C_2$, this error can be canceled by normalizing the difference $C_1-C_2$ by the sum $C_1+C_2$.
2. Tilt of head 714 relative to an axis parallel to the motion direction, which affects the balance between $C_1$ and $C_2$. This error cannot be overcome computationally.

Figure 34:
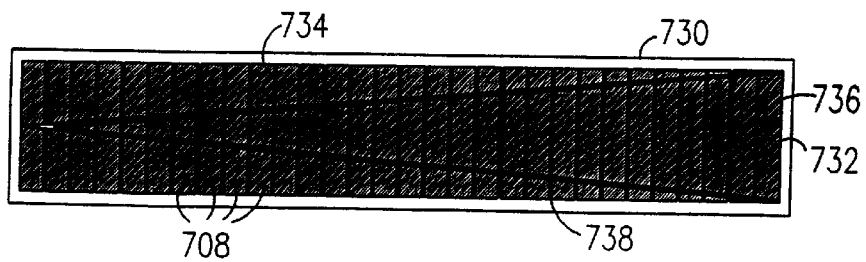
FIG. 34 is a schematic side view of a ruler for use in an absolute-reading capacitive linear encoder, in accordance with another preferred embodiment of the present invention.

FIG. 34 is a schematic side view of an alternative transmitter pattern 732 on a ruler 730, which is designed to overcome the above-mentioned problem of tilt sensitivity, in accordance with a preferred embodiment of the present invention. Three triangles 734, 736 and 738, instead of two, are employed in the coarse mode, resulting in a configuration which is symmetrical with respect to the tilt axis. If $C_1$ is the combined capacitance due to triangles 734 and 738, and $C_2$ is the capacitance due to triangle 736, then variations in $C_1$ and $C_2$ are, at least to first order, self-compensating.

Another method that can be used to achieve an absolute reading from an incremental encoder is to generate an index pulse at a known location, which is defined as a mechanical zero—usually one of the ends of the ruler in the case of a linear encoder. On system turn-on, the head is moved over the index location, and the absolute location is determined from then on. This technique can be employed in both angular and linear capacitive encoders.

Figure 35:
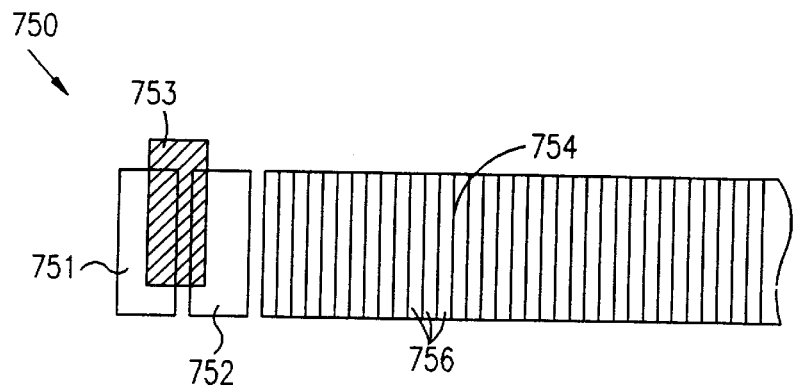
FIG. 35 is a schematic side view of an indexed capacitive linear encoder, in accordance with a preferred embodiment of the present invention.

FIG. 35 is a schematic side view of a Type 1 capacitive linear encoder 750 illustrative of this indexing concept, in accordance with a preferred embodiment of the present invention. A ruler 754, comprising multiple transmitter bars 756, as described hereinabove, has additional index transmitting plates 751 and 752 added, typically at one of its ends. A reading head 753 comprises a rectangular receiver plate. Preferably, head 753 has a switched pattern, such as pattern 716 on head 714 (FIG. 33B), so that it can serve as a common receiver for both the fine measurement and index channels.

Figure 36A:
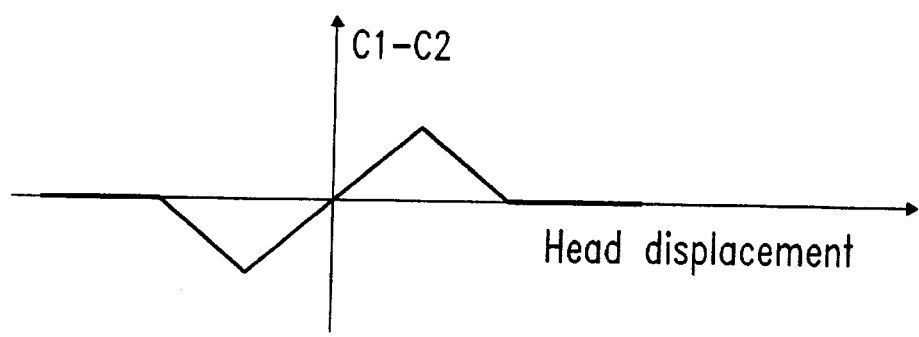
FIGS. 36A and 36B are graphs that schematically illustrate readings derived from the encoder of FIG. 35.
Figure 36B:
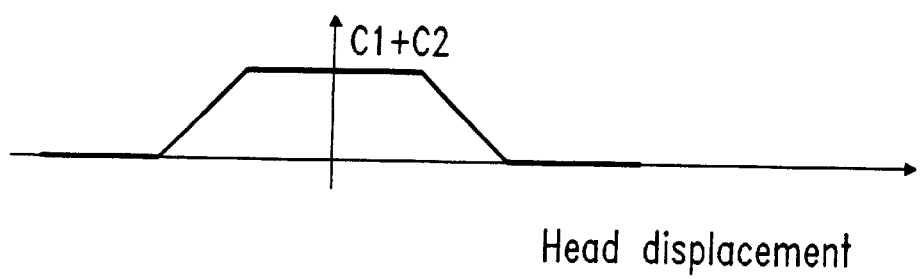

FIGS. 36A and 36B are graphs schematically showing a capacitance $C_1$, sensed between head 753 and plate 751, and a capacitance $C_2$, sensed between head 753 and plate 752. FIG. 36A shows the difference $C_1-C_2$ as a function of the head displacement, and FIG. 36B shows the sum $C_1+C_2$. The coincidence of a zero output signal in the difference channel with an output signal above a preset threshold in the sum channel indicates the index location.

Signal conditioning for encoder 750 is preferably based on a simplified version of circuit 330 shown in FIG. 13. In this case, bars 756 associated with the position channel are excited with four-phase voltages 340 to 343 at one frequency to provide the sine and cosine signals at the outputs of low-pass filters 356 and 357. Plates 751 and 752 of the index channel are excited by voltage sources 332 and 333 to provide signals at the output of low-pass filters 354 and 355 that are proportional to the index capacitances $C_1$ and $C_2$ In addition to the features that have been specifically described herein with reference to CLDEs, it will be understood that other features described hereinabove with reference to CFRAAE devices may also be adapted for use with CLDEs, and vice versa. More generally, although in the preferred embodiments. described herein, aspects of capacitive motion encoders are shown in certain combinations and configurations, similar elements and features may be adapted and grouped differently in other devices based on the principles of the present invention. In this regard, inventive features described with reference to one of the six encoder types defined herein may typically be applied to other types, as well. All such combinations and sub-combinations, adaptations and configurations are considered to be within the scope of the present invention.

It will thus be appreciated that the preferred embodiments described above are cited by way of example, and the full scope of the invention is limited only by the claims.

What is claimed is:

1. A capacitive motion encoder for sensing the position of a moving object relative to a stationary object, comprising:
   at least one stationary element, coupled to the stationary object;
   a moving element, coupled to the moving object and in proximity to the stationary element;
   a field transmitter, which generates an electrostatic field, which is modulated by a change in capacitance between the stationary and moving elements responsive to relative motion of the elements;
   a conductive shield, which is electrically decoupled from both the moving and the stationary objects, and which encloses the moving and stationary elements so as to shield the elements from external electrical interference; and
   processing circuitry, coupled to sense the modulated electrostatic field and to determine responsive thereto a measure of the position of the moving object.

2. An encoder according to claim 1, wherein the stationary element comprises a printed circuit board including an extension which protrudes through the shield, to which an electrical connection is made to the encoder.

3. An encoder according to claim 1, wherein the field transmitter is attached to the stationary element and is coupled so as to form a part of the conductive shield.

4. An encoder according to claim 1, and comprising a mechanical housing around the moving and stationary elements, which housing is electrically decoupled from the shield.

5. An encoder according to claim 7, wherein the at least one stationary element comprises two generally parallel, mutually spaced stationary elements, one including the field transmitter and the other including a field receiver, which are electrically coupled one to the other in the housing by pressure of the elements against a flexible conductive member therebetween.

6. An encoder according to claim 1, wherein the moving element comprises a rotor, and the moving object comprises a rotating shaft, and wherein the at least one stationary element comprises at least one stator, such that the processing circuitry determines a measure of the rotational position of the shaft.

7. An encoder according to claim 6, wherein the conductive shield encloses at least a portion of the processing circuitry together with the rotor and the at least one stator.

8. An encoder according to claim 7, wherein the at least one stator and the rotor comprise printed circuit boards, on at least one of which at least the portion of the processing circuitry is mounted.

9. An encoder according to claim 6, wherein the rotor comprises a generally planar plate and a substantially non-planar, annular hub for coupling the rotor to the shaft, and wherein the shield extends into the plane of the rotor adjacent to the hub so as to prevent electrical interference from passing from the shaft to the rotor.

10. An encoder according to claim 6, wherein the encoder is configured so that the rotor can rotate by at least 360° relative to the stator.

11. An encoder according to claim 1, wherein the field transmitter is attached to the stationary element, and wherein the moving element has an electrically-active pattern thereon, which modulates the electrostatic field.

12. An encoder according to claim 11, wherein the electrically-active pattern comprises a dielectric material.

13. An encoder according to claim 11, wherein the electrically-active pattern comprises a conductive material.

14. An encoder according to claim 13, wherein the conductive material is coupled to the processing circuitry and serves as a receiver of the electrostatic field.

15. An encoder according to claim 13, wherein the at least one stationary element comprises a receiver of the electrostatic field, which is coupled to the processing circuitry.

16. An encoder according to claim 15, wherein the conductive, electrically-active pattern on the moving element is electrically floating.

17. An encoder according to claim 15, wherein the at least one stationary element comprises a single element to which both the transmitter and receiver are attached.

18. An encoder according to claim 15, wherein the conductive, electrically-active pattern on the moving element is held at a generally constant potential.

19. An encoder according to claim 18, and comprising a second stationary element having both a transmitter and receiver attached thereto.

* * * * *